(12) United States Patent
Matsuda

(10) Patent No.: US 7,167,257 B2
(45) Date of Patent: Jan. 23, 2007

(54) METHOD AND APPARATUS FOR CONTROLLING IMAGE OUTPUT ON MEDIA OF DIFFERENT OUTPUT DEVICES

(75) Inventor: Hiroshi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 09/769,466

(22) Filed: Jan. 26, 2001

(65) Prior Publication Data

US 2003/0189717 A1 Oct. 9, 2003

(30) Foreign Application Priority Data

Jan. 27, 2000 (JP) ............................. 2000-018337
Jan. 18, 2001 (JP) ............................. 2001-009621

(51) Int. Cl.
*G06F 15/00* (2006.01)
*G06K 1/00* (2006.01)

(52) U.S. Cl. .................................... 358/1.15; 358/1.13

(58) Field of Classification Search ................. 358/1.9, 358/1.1, 1.11–1.18, 296, 401, 448

See application file for complete search history.

(56) References Cited

U.S. PATENT DOCUMENTS

| 4,686,544 A | | 8/1987 | Ikeda et al. |
| 5,132,702 A | | 7/1992 | Shiozaki et al. |
| 5,630,062 A | * | 5/1997 | Okutsu ........................ 718/100 |
| 5,812,747 A | * | 9/1998 | Kayano et al. ............. 358/1.15 |
| 5,909,602 A | * | 6/1999 | Nakai et al. .................... 399/8 |
| 6,031,631 A | * | 2/2000 | Tahara et al. ............... 358/296 |
| 6,348,971 B1 | * | 2/2002 | Owa et al. ................. 358/1.15 |
| 2001/0052995 A1 | * | 12/2001 | Idehara ....................... 358/1.15 |

FOREIGN PATENT DOCUMENTS

| JP | 07095334 A | * | 4/1995 |
| JP | 2000206836 A | * | 7/2000 |

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

The present invention relates to an image output control apparatus connected to plural image output devices through communication media, capable of controlling to output images of predetermined input data using the plural image output devices, a control method of the image output control apparatus and a storage medium thereof. According to the present invention, in accordance with an operation input performed by an operator on the basis of information regarding the plural image output devices displayed on a display unit, the plural image output devices for outputting images are selected, output media information stored in each the image output device of the selected plural image output devices is obtained, and it is judged whether or not the selected plural image output devices have the same-sized output media on the basis of the obtained output media information. According to the judged result, display on the display unit is controlled, thereby realizing to improve operability in a setting operation when dispersive output processing is executed.

97 Claims, 19 Drawing Sheets

FIG. 20

RECORDING MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS OF FLOW CHART SHOWN IN FIG. 7 |
| SECOND DATA PROCESSING PROGRAM<br>PROGRAM CODE GROUP CORRESPONDING TO STEPS OF FLOW CHARTS SHOWN IN FIGS. 13 TO 15 |
| THIRD DATA PROCESSING PROGRAM<br>CONTROL PROGRAM CODE GROUP CORRESPONDING TO EACH TASK IN TASK STRUCTURE SHOWN IN FIG. 6 |
| FOURTH DATA PROCESSING PROGRAM<br>PROGRAM CODE GROUP CORRESPONDING TO STEPS IN FLOW CHARTS SHOWN IN FIGS. 13 TO 14 AND 16 |
| FIFTH DATA PROCESSING PROGRAM<br>PROGRAM CODE GROUP CORRESPONDING TO STEPS IN FLOW CHARTS SHOWN IN FIGS. 14 TO 15 AND 17 |
| SIXTH DATA PROCESSING PROGRAM<br>PROGRAM CODE GROUP CORRESPONDING TO STEPS IN FLOW CHART SHOWN IN FIG. 19 |
| |

MEMORY MAP OF STORAGE MEDIUM

METHOD AND APPARATUS FOR CONTROLLING IMAGE OUTPUT ON MEDIA OF DIFFERENT OUTPUT DEVICES

BACKGROUND OF THE INVENTION

1. Field of the Invention

The present invention relates to an image output control apparatus connected to plural image output devices through communication media, capable of controlling output of images of predetermined input data using the plural image output devices, a control method of the image output control apparatus and a storage medium thereof.

2. Related Background Art

There has been known an image formation system of connecting plural image output devices such as digital copying machines, printers and the like through communication media, which is capable of controlling from a host computer such as a PC (personal computer) or the digital copying machine to output of images using the plural image output devices.

In recent years, in such an image formation system, dispersive output processing of dispersively executing an image output based on predetermined data stored in or generated by the host computer or the digital copying machine using the plural image output devices comes to be realized. For example, there has been proposed an image formation system of realizing an operation mode called as cascade copying for outputting image data inputted by reading originals by a scanner unit equipped in an image output device, using the plural image output devices.

In this image formation system, in the case of performing a copying operation of a large number of originals, a set number of copies can be dispersively copied by distributing the set number of copies to the plural image output devices by selecting a cascade copying mode. Accordingly, a time taken in finishing a copying operation of the set number of copies can be shortened as compared with a case of copying the set number of copies using one device. As a result, image output reproducibility can be improved.

In case of performing the cascade copying, it is required to select the plural image output devices for outputting images among the plural image output devices constituting the image formation system so as to specify the image output devices for performing the cascade copying.

Also, it is required to set various output functions or output forms (in the present application, called an image output mode) such as the following conditions. That is, for example, the copying operation is performed or not performed by two-sided copying, what size (A4, B4, etc.) and what kind (sheet quality, thickness and color) of output media should be used for outputting images, whether an image is to be outputted by monochrome or color, and the like.

In recent years, the image formation system is constituted by the plural image output devices of which functions are different from each other. In this case, since the image output mode which can be realized by each image output device is sometimes different from image output mode of another image output device, there occurred a case that a selection of the devices and setting of the image output mode become complex or an erroneous image output is performed.

To cope with the above-described problems occurring when the dispersive output processing such as the cascade copying or the like is executed, the present applicant applies "image output device priority setting" and "image output mode priority setting". Such image output device priority setting and image output mode priority setting were not yet known when the priority Japanese patent applications of the present U.S. application were filed in Japan.

The image output device priority setting represents that the plural image output devices for performing the cascade copying are initially selected, then only the image output mode by which images can be commonly outputted using the selected plural image output devices is enabled to be set, and the selection of the plural image output devices and the setting of the image output mode are performed by setting the image output mode.

The image output mode priority setting represents that the image output mode is initially set, then only the image output device which can output images by the set image output mode is enabled to be selected, and the selection of the plural image output devices and operation setting of the image output mode are performed by selecting the image output device.

With reference to an example of performing the cascade copying using the two image output devices, the above-described image output device priority setting will be explained. At first, the two image output devices for performing the cascade copying are selected, then only the image output mode by which the images can be commonly outputted using the selected two image output devices is enabled to be set.

For example, in a case where both of the selected two image output devices have a color output function and only one of the selected two image output devices has a two-sided print function, a two-sided print setting button or the like is deleted from a setting screen. Accordingly, setting of the two-sided print is not to be performed by an operator.

Only the button of the image output mode which can be set is to be displayed on the setting screen, and the device selection and the setting of the image output mode can be simplified by setting the image output mode. Furthermore, an erroneous operation by the operator can be prevented.

The above image output device priority setting and the image output mode priority setting are not limited to a case of the cascade copying but may be widely adopted to a case that various dispersive output processing including dispersive print processing of outputting various data edited on a PC are executed using the plural image output devices.

However, conventionally, in the above-described image output device priority setting, even when the selected plural image output devices for the purpose of the cascade copying do not have the same size or the same kind of output media, the image output mode or the like can be set thereafter.

Therefore, after the operator performs various settings, when a start instruction of the cascade copying is given, or when it is started to output images upon giving the start instruction of the cascade copying, the operator first notices that the images cannot be outputted because the selected plural image output devices do not have the same size or the same kind of output media. That is, there occurred a problem that various setting operations performed previously result in wasted effort.

In order to avoid this kind of erroneous setting operation, the operator has to previously confirm or grasp whether or not the same size or the same kind of output media are stored in each selected image output device. After all, there remains a problem that simplification in the selection of the image output device and the setting of the image output mode according to the image output device priority setting cannot be achieved.

These problems commonly occurred not only in a case of performing the cascade copying, but also in a case of performing the image output device priority setting in an image processing system capable of executing the dispersive output processing.

SUMMARY OF THE INVENTION

The present invention can solve the above-described problems, and an object of the present invention is to provide an image output control apparatus which can prevent a state that after an operator performs various settings, when a start instruction of cascade copying is given, or when it is started to output images upon giving the start instruction of the cascade copying, the operator first notices that the images cannot be outputted because selected plural image output devices do not have the same size output media, such that various setting operations performed before resulted in wasted effort. The present invention is also directed to a control method of the above-discussed image output control apparatus and a storage medium thereof.

Another object of the present invention is to provide an image output control apparatus which can prevent a state that after the operator performs the various settings, when the start instruction of the cascade copying is given, or when it is started to output the images upon giving the start instruction of the cascade copying, the operator first notices that the images cannot be outputted because the selected plural image output devices do not have the same size and the same kind of output media, such that the various setting operations performed before result in wasted effort. The invention is also directed to a control method of the above-discussed image output control apparatus and a storage medium thereof.

Still another object of the present invention is to eliminate the necessity that the operator has to previously confirm or grasp whether or not the same size or the same kind of output media is stored in every selected image output device, and is to provide an image output control apparatus which can surely achieve the simplification in the selection of the image output device and the setting of the image output mode according to the image output device priority setting, a control method of the image output control apparatus and a storage medium thereof.

As one of the means for achieving the above objects, the present invention provides the image output control apparatus connected to the plural image output devices through communication media, capable of controlling output of images of predetermined input data using the plural image output devices, comprising:

selection means for selecting the plural image output devices for outputting images;

obtaining means for obtaining output media information stored in each image output device among the plural image output devices selected by the selection means;

judgment means for judging whether or not the plural image output devices selected by the selection means store the same-sized output media on the basis of the output media information obtained by the obtaining means; and notification means for notifying a judgment result obtained by the judgment means.

The above objects of the present invention will become apparent from the attached drawings and the following detailed description based on the attached drawings.

BRIEF DESCRIPTION OF THE DRAWINGS

FIG. 20 is a view for explaining a memory map of a storage medium which stores various data processing programs which can be read out by the image output device or the PC to which the present invention is applicable.

DETAILED DESCRIPTION OF THE PREFERRED EMBODIMENTS

First Embodiment

Hereinafter, the embodiments of the present invention will be explained in detail with reference to the accompanying drawings.

Figure 1:
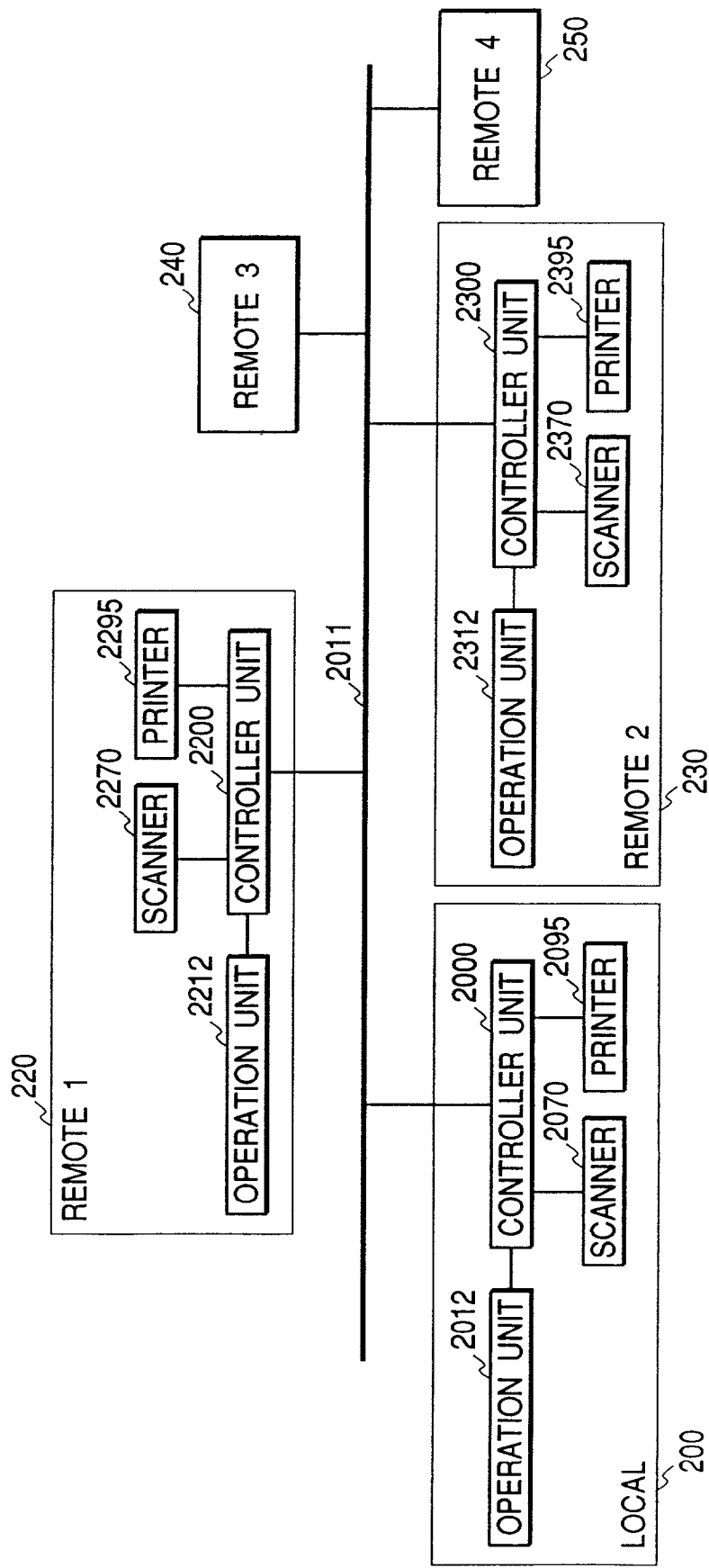
FIG. 1 is a block diagram for explaining an entire structure of an image formation system including image output devices to which image output control apparatuses indicating a first embodiment of the present invention can be adopted.

FIG. 1 is a block diagram for explaining an entire structure of an image formation system including image output devices to which image output control apparatuses indicating a first embodiment of the present invention can be adopted.

In FIG. 1, numeral 200 denotes an image output device which is composed of a scanner unit 2070 being an image input device, a printer unit 2095 being an image output device, a controller unit 2000 for totally controlling an entire of the image output device 200 and an operation unit 2012 being a user interface.

The scanner unit 2070, the printer unit 2095 and the operation unit 2012 are respectively connected to the controller unit 2000, which is connected to a network communication means such as a LAN (Local Area Network) 2011 (e.g., Ethernet) or the like.

Other image output devices 220, 230, 240 and 250 which have the same structure as that of the image output device 200 are connected to the LAN 2011.

Similar to the image output device 200, the image output device 220 is composed of a scanner unit 2270 being the image input device, a printer unit 2295 being the image output device, a controller unit 2200 for totally controlling an entire of the image output device 220 and an operation unit 2212 being the user interface. The scanner unit 2270, the printer unit 2295 and the operation unit 2212 are respectively connected to the controller unit 2200.

Similarly, the image output device 230 is composed of a scanner unit 2370 being the image input device, a printer unit 2395 being the image output device, a controller unit 2300 for totally controlling an entire of the image output device 230 and an operation unit 2312 being the user interface. The scanner unit 2370, the printer unit 2395 and the operation unit 2312 are respectively connected to the controller unit 2300. The image output devices 240 and 250 have the same structure as that of the image output device 200.

Hereinafter, the structure of the image output device to which the image output control apparatus can be adopted will be explained with reference to the image output device 200. The image output devices 200, 220, 230, 240 and 250 may be the image output devices having identical image output functions (media size for images which can be outputted, the kind of medium for images which can be outputted, sorting function, two-sided copying function and the like) as each other or may be the image output devices having different image output functions than each other.

Figure 2:
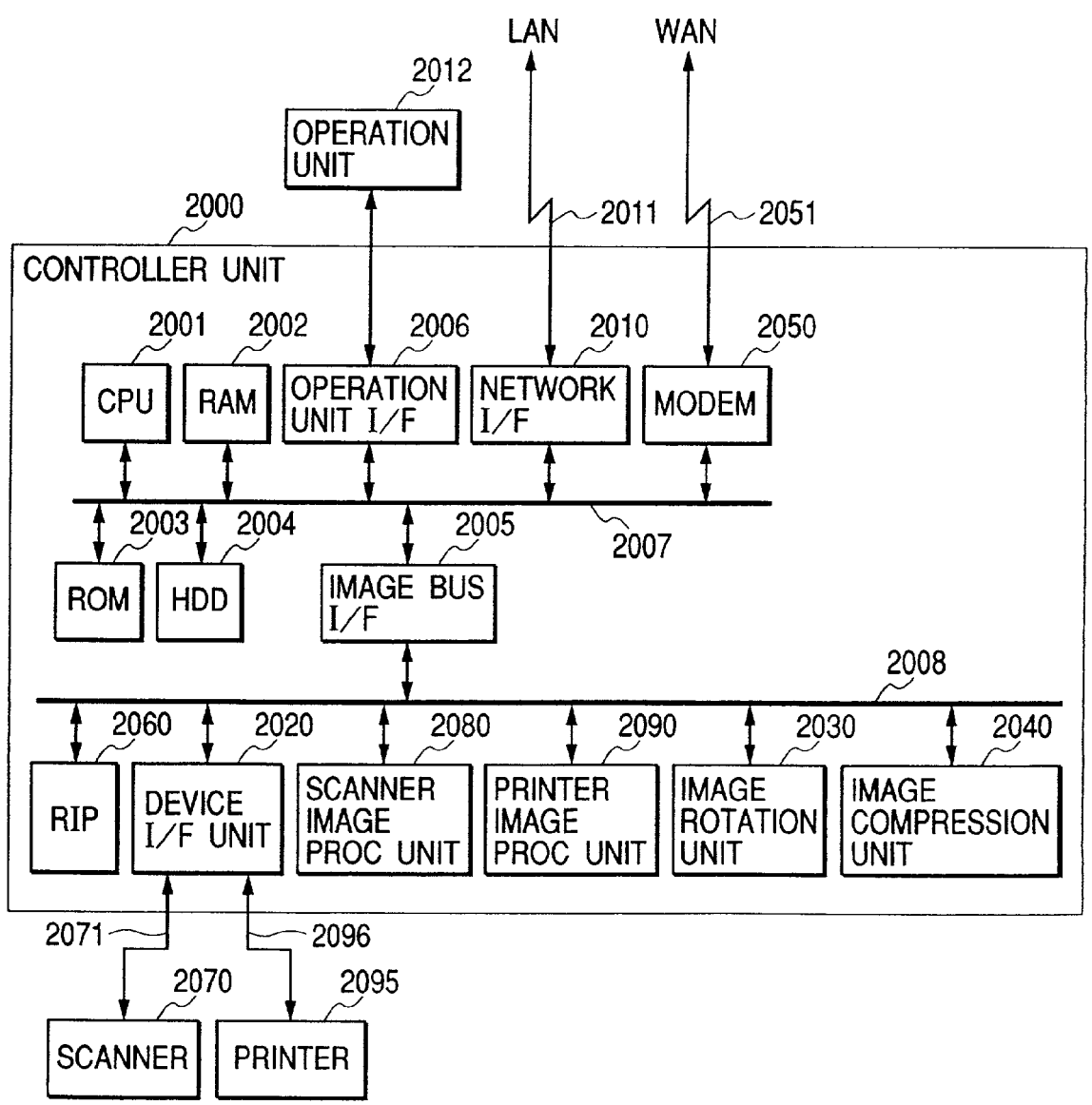
FIG. 2 is a block diagram for explaining the structure of the image output device shown in FIG. 1.

FIG. 2 is a block diagram for explaining the structure of the image output device 200 shown in FIG. 1. In FIG. 2, the same parts as those in FIG. 1 are added with the same numerals respectively.

As shown in FIG. 2, the controller unit 2000 is connected to the scanner unit 2070 and the printer unit 2095. While, the controller unit 2000 is also connected to the LAN 2011 and a public line (WAN: Wide Area Network) 2051, thereby performing an input/output operation of image information and device information including output media information.

In the controller unit 2000, numeral 2001 denotes a CPU which entirely controls the system on the basis of programs stored in a ROM (Read Only Memory) 2003, a hard disk drive (HDD) 2004 or another storage medium (not shown). Numeral 2002 denotes a RAM (Random Access Memory) which acts as a system work memory for an operation of the CPU 2001 and also acts as an image memory for temporarily storing image data. The ROM 2003 is a boot ROM which stores a boot program or the like of the system. The HDD 2004 stores system software, image data and the like.

The operation unit 2012 is the user interface unit (UI) for performing various settings of the image output device 200. Numeral 2006 denotes an operation unit interface (I/F) which controls various input/output operations of the operation unit 2012 by outputting image data to be displayed on the operation unit 2012 to the operation unit 2012 and notifying information inputted by a user of the present system using the operation unit 2012 to the CPU 2001.

Numeral 2010 denotes a network interface (Network I/F) which is connected to the LAN 2011 and performs an input/output operation of information through the LAN 2011. The CPU 2001 can obtain information regarding the size or kind of output media, information regarding the condition of the each image output device and the like stored in the each image output device located on the LAN 2011 through the network interface 2010.

Numeral 2050 denotes a Modem which is connected to the public line 2051 and performs an input/output operation of information through the public line 2051. The above-described devices are located on a system bus 2007.

Numeral 2005 denotes an image bus interface (Image Bus I/F) which is used for connecting the system bus 2007 to an image bus 2008 for transferring image data at a high speed, and acts as a bus bridge for converting the data structure. The image bus 2008 is structured by a PCI (Peripheral Component Interconnected) bus or an IEEE 1394. On the image bus 2008, the following devices are located.

Numeral 2060 denotes a raster image processor (RIP) which develops a page description language (PDL) code to a bit map image. Numeral 2020 denotes a device interface (device I/F) unit which connects the scanner unit 2070 or the printer unit 2095 to the controller unit 2000 through an image input unit interface (video bus), performs a sync system/non-sync system conversion of the image data, and inputs raster image data of an interface 2071 from the scanner unit 2070 and outputs raster image data of an interface 2096 to the printer unit 2095 through a printer unit interface (video bus).

Numeral 2080 denotes a scanner image processing unit which executes correcting, forming and editing processes to input image data. Numeral 2090 denotes a printer image processing unit which performs a printer correction, a resolution conversion or the like to print output image data.

Numeral 2030 denotes an image rotation unit which rotates the image data. Numeral 2040 denotes an image compression unit which performs compression/expansion processing such as a JPEG (Joint Photographic experts Group) system for multi value image data and the JPIG (Joint Bi-level Image experts Group) system, an MMR (Modified Modified READ) encoding, an MH (Modified Huffman) encoding or the like for binary image data.

Hereinafter, the scanner unit 2070 being the image input device and the printer unit 2095 being the image output device shown in FIG. 1 will be explained with reference to FIG. 3.

Figure 3:
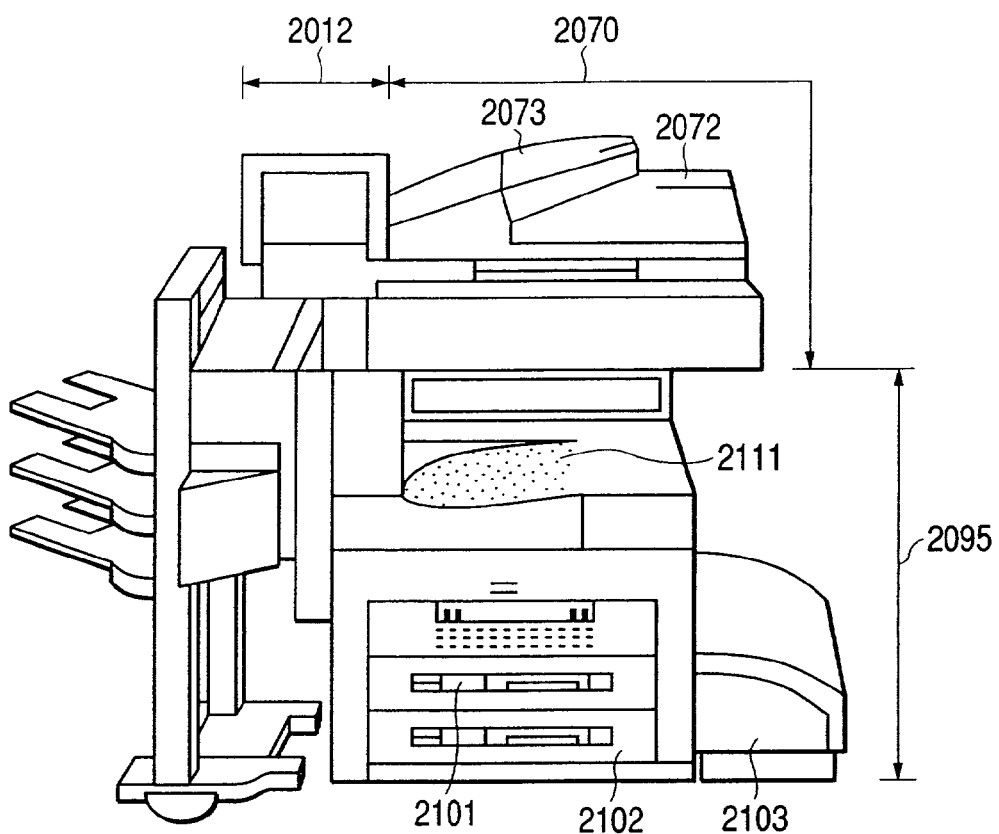
FIG. 3 is a view for explaining a scanner unit and a printer unit shown in FIG. 1.

FIG. 3 is a view showing an external appearance of the image output device 200 including the scanner unit 2070 and the printer unit 2095 shown in FIG. 1. In FIG. 3, the same parts as those in FIG. 1 are provided with the same numerals respectively.

In FIG. 3, numeral 2072 denotes an original feeder which feeds original sheets (or original papers) set in a tray 2073 one by one when originals are read.

The printer unit 2095 has plural sheet feed stages (here, stages one to three) such that different media size, different media direction or different kind of media can be selected and has corresponding sheet cassettes 2101 and 2102 and sheet deck 2103. Numeral 2111 denotes a sheet discharge tray which receives the printed media.

Hereinafter, an operation in each part will be explained.

The scanner unit 2070 being the image input device irradiates an image on a sheet being an original and converts the read image data to an electric signal as the raster image data of the interface 2071 (FIG. 2) by scanning the image on the original using a CCD line sensor.

The original sheets are set in the tray 2073 provided on the original feeder 2072 which feeds the original sheets one by one, and an operation of reading original images is started upon giving a read start instruction from the CPU 2001 to the scanner unit 2070 by giving the read start instruction through the operation unit 2012 from the user of the device.

The printer unit being the image output device is a portion where the raster image data of the interface 2096 is converted to an image on the sheet, and a method thereof may be any of an electrophotographic system using a photosensitive drum or a photosensitive belt, an inkjet system for directly printing an image on a sheet by discharging ink from a microscopic nozzle array, a thermal transfer system, a sublimation system and the like.

Starting of a printing operation is initiated by an instruction of the interface 2096 from the CPU 2001.

Hereinafter, the structure of the operation unit 2012 shown in FIG. 1 will be explained with reference to FIG. 4.

Figure 4:
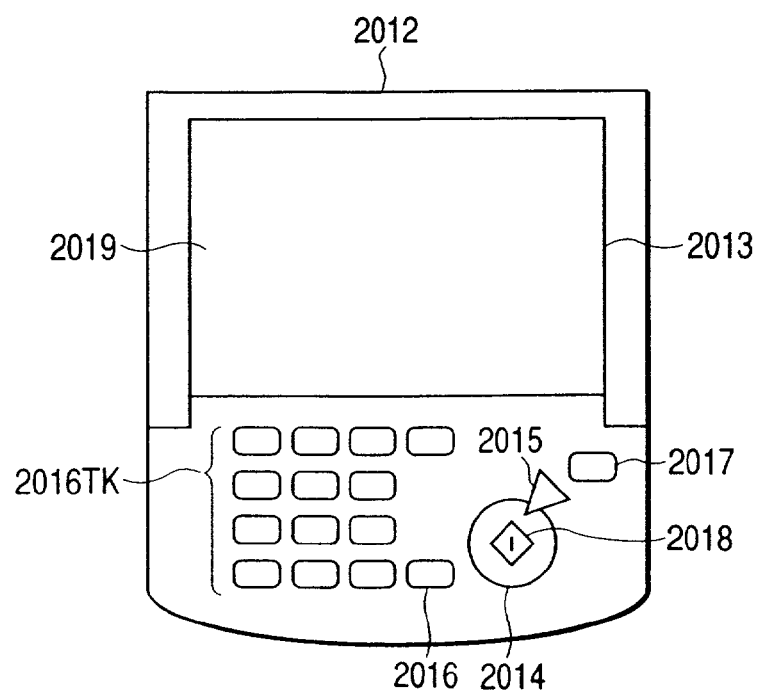
FIG. 4 is a plan view for explaining the structure of an operation unit shown in FIG. 1.

FIG. 4 is a plane view for explaining the structure of the operation unit 2012 shown in FIG. 1.

In FIG. 4, numeral 2013 denotes an LCD (Liquid Crystal Display) unit on which a touch panel sheet 2019 is pasted. This structured LCD unit displays an operation screen of the system and software keys and notifies position information to the CPU 2001 being a controller when the key being displayed on the LCD is depressed or touched.

Numeral 2014 denotes a start key which is depressed when an original image reading operation is to be started. Numeral 2018 denotes an LED for emitting two colors of green and red, and it is provided on a central position of the start key 2014 to indicate whether or not the start key 2014 is in a usable state according to those two colors.

Numeral 2015 denotes a stop key which is depressed when a running operation is to be stopped. Numeral 2016 denotes an ID (identity) key which is used when a user ID for a user is to be inputted. Numeral 2017 denotes a reset key which is depressed when the setting instructed from the operation unit is to be initialized. Symbol 2016TK denotes ten keys which are used when the number of copies or the like is to be inputted.

Hereinafter, the structure of the operation unit of the image output device to which the image output control apparatus indicating embodiments of the present invention can be adopted will be explained with reference to FIG. 5.

Figure 5:
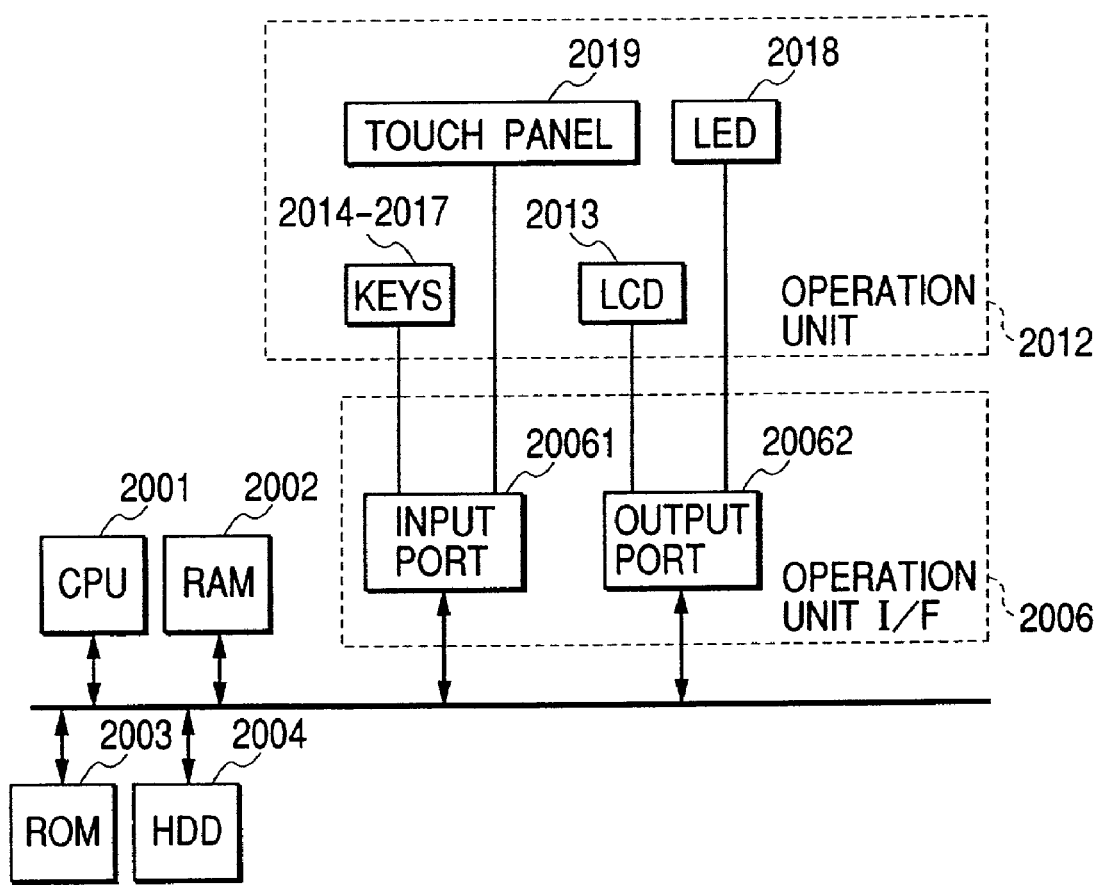
FIG. 5 is a block diagram for explaining the structure of an operation unit of the image output device to which the image output control apparatus indicating embodiments of the present invention can be adopted.

FIG. 5 is a block diagram for explaining the structure of the operation unit of the image output device to which the image output control apparatus indicating the embodiments of the present invention can be adopted.

In FIG. 5, the CPU 2001 totally controls an accessing operation with various devices connected to the system bus 2007 (FIG. 2) on the basis of control programs or the like stored in the program ROM 2003, the HDD 2004 or another storage medium (not shown), reads input information from the scanner unit 2070 connected through the image input unit interface 2071 (FIG. 2) and outputs an image signal being output information to the printer unit 2095 connected through the printer unit interface 2096.

Figure 6:
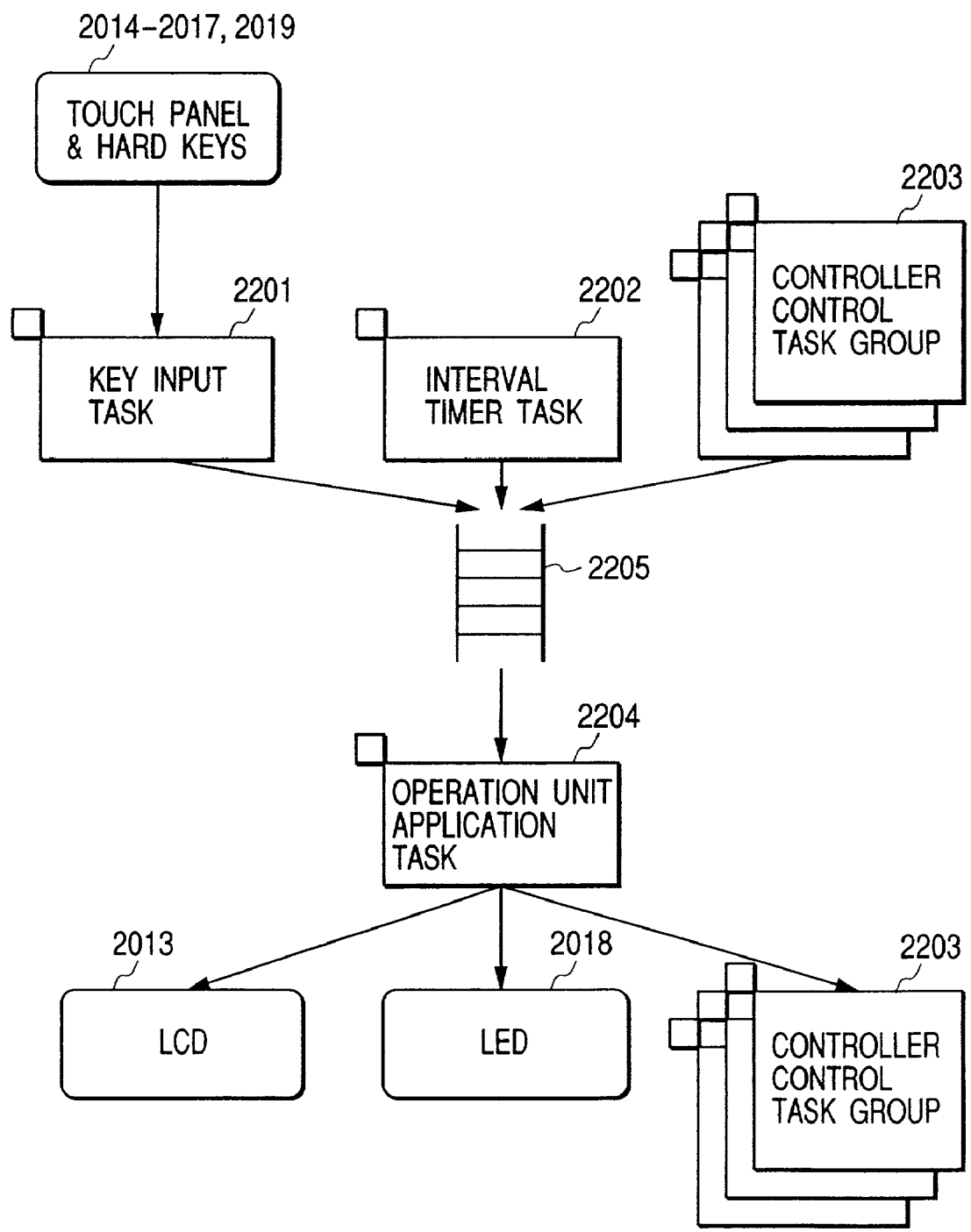
FIG. 6 is a task structural view of an operation display system showing one example of the software structure regarding an operation display of the image output device to which the image output control apparatus indicating one embodiment of the present invention can be adopted.
Figure 7:
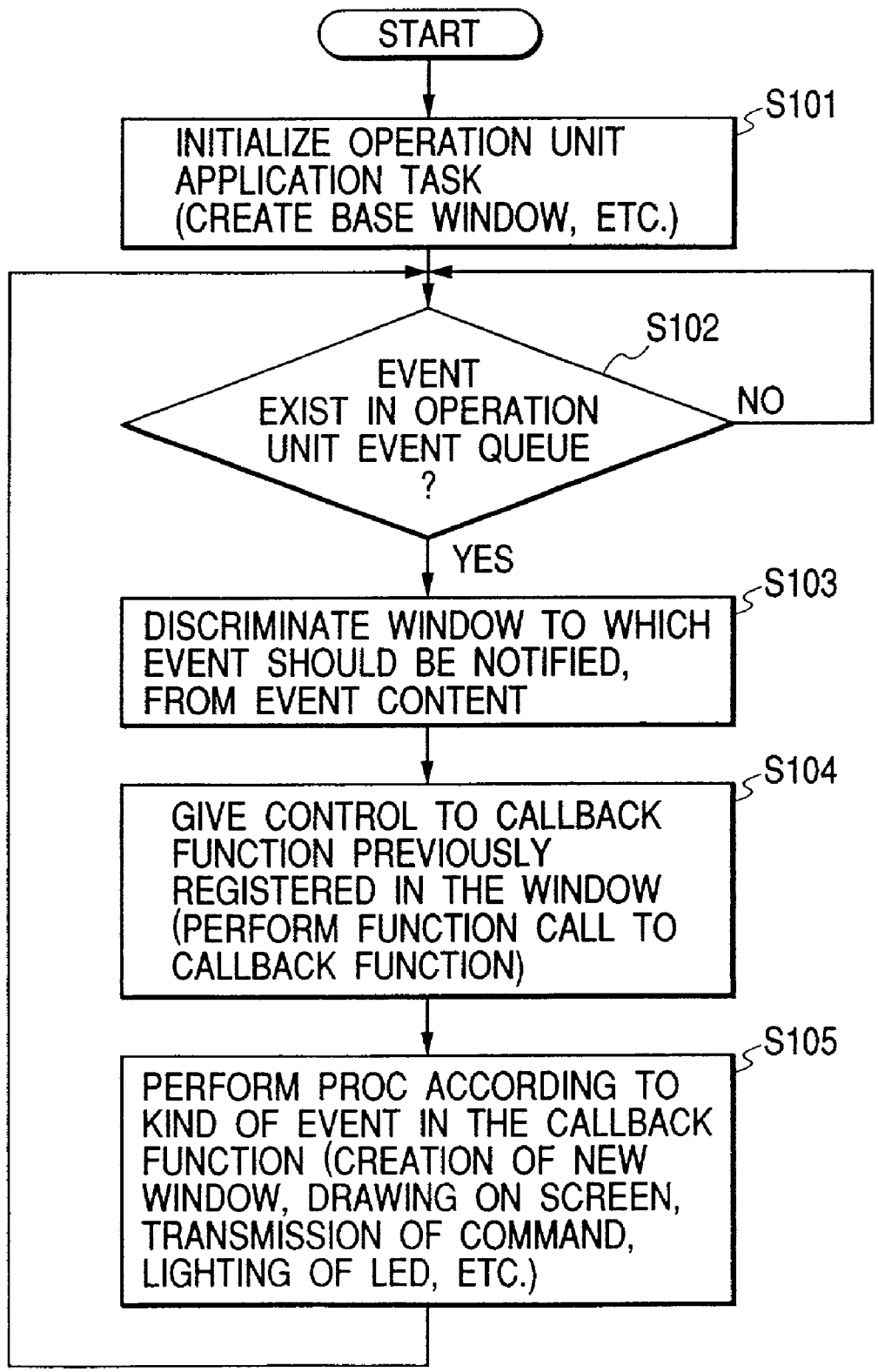
FIG. 7 is a flow chart showing one example of first control processing executed in the image output device to which the image output control apparatus of the present invention can be adopted.
Figure 8:
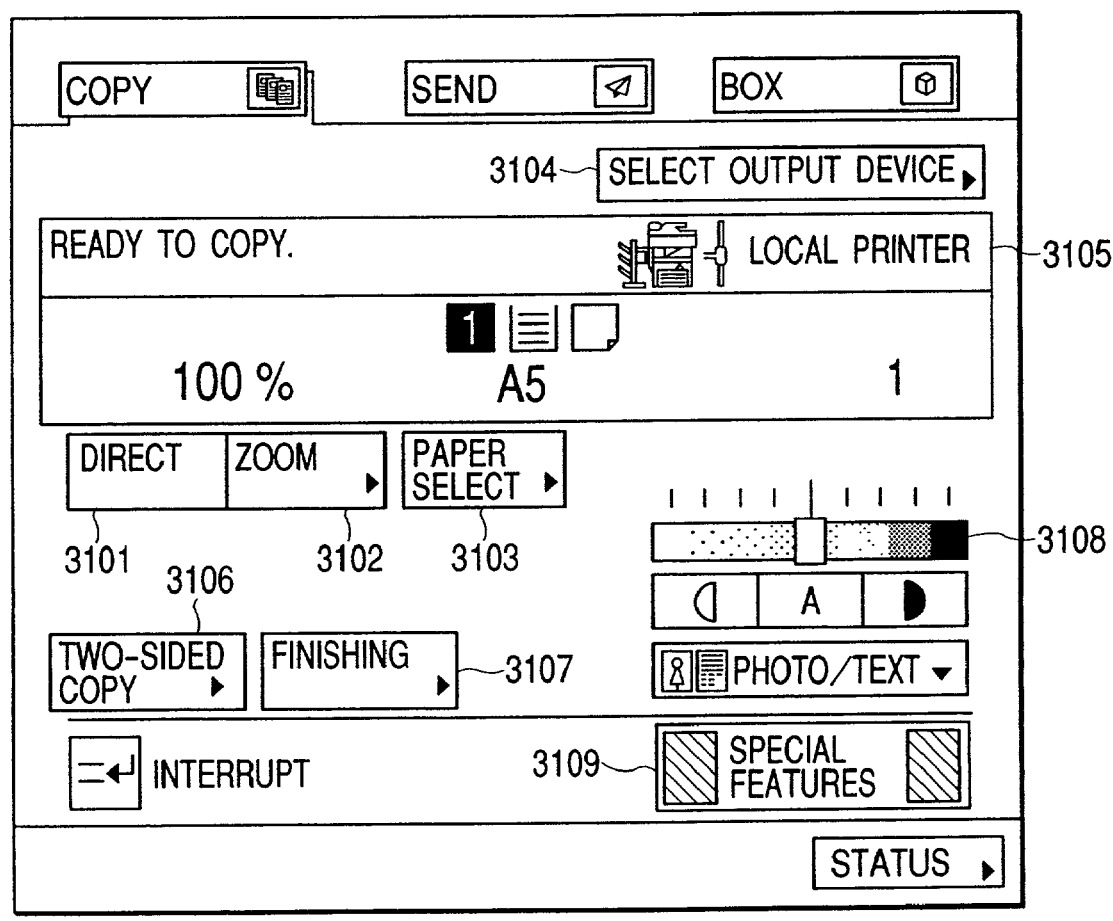
FIG. 8 is a view showing an operation setting screen of the image output device to which the image output control apparatus of the present invention can be adopted.

In the program ROM 2003, the control programs as shown in a task structural view in FIG. 6 described later and flow charts in FIGS. 7 and 8 are stored. The RAM 2002 functions as a main memory, a work area or the like of the CPU 2001.

The CPU 2001 obtains operation content through an input port 20061 by receiving information inputted by the user using the touch panel 2019 and hard keys 2014 to 2017 and generates display screen data on the basis of the obtained operation content and the above-described control programs to output that data to an output port 20062.

The output port 20062 being an output device controller for controlling a screen output device outputs a displaying screen to the screen output device such as the LCD unit 2013, a CRT (not shown) or the like on the basis of the display screen data inputted from the CPU 2001, and controls an on/off blinking of the LED 2018 on the basis of LED on/off blinking data inputted from the CPU 2001.

FIG. 6 is a task structural view of an operation display system showing one example of the software structure regarding an operation display of the image output device to which the image output control apparatus indicating one embodiment of the present invention can be adopted.

In a part of the program ROM 2003 shown in FIG. 2, a task scheduling program called as a real-time OS (Operating System) is stored. Each task indicated in the task structural view of the operation display system shown in FIG. 6 is also controlled under the management of this real-time OS.

Numeral 2201 denotes a key input task which is started by an interrupt depending on a touch panel operation and a hard key operation performed by the operator, and processing of waiting a restart is repeated by plugging a key input event in an operation unit event queue 2205.

Numeral 2205 denotes the operation unit event queue which has FIFO (First-In, First-Out) structure of collectively receiving events from plural tasks. Numeral 2202 denotes an interval timer task which repeats processing of plugging a timer event in the operation unit event queue 2205 every interval of a predetermined time. Numeral 2203 denotes a task related to a control of the controller (controller control task group) which is not a task of the operation display system. However, the task 2203 has an interface of plugging a main body status event indicating a status of an equipment in the operation unit event queue 2205 or receiving a drive command of the equipment between the tasks of the operation display system (the key input task 2201 and the interval timer task 2202).

Numeral 2204 denotes an operation unit application task which captures various events plugged in the operation unit event queue 2205, executes processing corresponding to each of the events and repeats the processing until the operation unit events are all discharged. If the events are all discharged, a state of waiting the events is settled. As the processing corresponding to the events, drawing an image on the LCD unit 2013, lighting the LED 2018 and transmitting the command to the controller control task group 2203 are main processing.

Hereinafter, processing of the operation unit application task 2204 shown in FIG. 6 will be explained with reference to a flow chart in FIG. 7.

FIG. 7 is a flow chart showing one example of first control processing executed in the image output device to which the image output control apparatus of the present invention can be adopted. The CPU 2001 executes the first control processing on the basis of the program stored in the ROM 2003 or another storage medium (not shown) corresponding to one example of processing of the operation unit application task 2204 shown in FIG. 6. Reference symbols S101 to S105 respectively indicate steps.

At first, in the step S101, initializing processing of the task and various initializing processes to be once executed when the system is started are executed.

Next, in the step S102, it is investigated whether or not the event exists in the operation unit event queue 2205. When it is judged that the event does not exist, the processing executed in the step S102 is repeated.

On the other hand, in the step S102, when it is judged that the event exists in the operation unit event queue 2205, a window to be used for notifying the event is judged on the basis of the event content captured from the operation unit event queue 2205 in the step S103.

When the window to be used for notifying the event is judged, in the step S104, a control is given to a callback function (perform function call to callback function) previously registered in the judged window. Then, the flow advances to the step S105.

Processing in the step S105 is executed within a category of the callback function, and various content of the processing can be set according to the kind of windows. However, as general processing to be executed, processing of creating a new window, drawing a screen, transmitting a command, on/off blinking the LED or the like is executed.

Next, cascade copying performed in the image formation system including the image output devices to which the image output control apparatus can be adopted will be explained. As described above, the image output device 200 performs an input/output operation of the raster image data of the interface 2071 and the raster image data of the interface 2096 with the scanner unit 2070 and the printer unit 2095 through the video bus. The image output device 200 can also perform an input/output operation of image information with other plural image output devices through the LAN 2011.

Therefore, the image output device 200 can output the image data inputted by reading originals at the scanner unit 2070 using not only the printer unit 2095 but also the plural image output devices (printer units) including other plural image output devices. The cascade copying means an operation mode in the image formation system of performing a dispersive copy by distributing the set output number of copies to the plural image output devices in case of performing the plural number of copies for the originals.

In the image formation system shown in FIG. 1, an operation procedure in case of performing the cascade copying will be simply explained.

At first, the originals are set in the tray 2073, and setting of the output number of copies for the set originals, selection of the image output device (remote printer) for outputting images and setting of an image output mode (two-sided copying or not, the size or kind of output media, monochrome output or color output, or the like) are performed in the operation unit 2012.

Next, in the operation unit 2012, by depressing or touching the start key (button) by the operator, a start of the cascade copying is instructed. Then, it is started to read the originals set in the tray 2073 according to an input of the instruction.

The image data obtained by reading the originals, an output request command based on the setting performed in the operation unit 2012, and the like are transmitted to the selected each image output device through the LAN 2011. In each image output device, an image output based on the received image data is performed.

In case of outputting images, the each image output device performs the image output according to image output mode information included in the received output request command or the like. For example, in the operation unit 2012, when it is set to output an image using A4 size output media as the image output mode, the selected each image output device feeds the output media from a cassette stage storing the A4 size output media, forms images on the output media on the basis of the received image data and discharges the output media to the discharge tray.

A series of the cascade copying operation is terminated upon achieving the image output of the distributed number of copies in all of the selected image output devices.

As described above, before starting the cascade copying, the operator has to perform various settings in the operation unit 2012. In the present embodiment, the selection of the plural image output devices and the setting of the image output mode are performed on the basis of the image output device priority setting recently proposed.

The image output device priority setting means that the plural image output devices for performing the cascade copying are initially selected and only the image output mode capable of being commonly outputted by the selected plural image output devices is enabled to be set. Then, the image output mode is set. Here, as a concrete example of the image output device priority setting, a case of performing the cascade copying using the two image output devices will be explained.

At first, the operator selects the two image output devices for performing the cascade copying in the operation unit 2012.

In accordance with an operation input performed by the operator, the CPU 2001 enables to set only the image output mode capable of being commonly outputted by the selected two image output devices on the basis of device information previously stored in the HDD 2004 or the like.

That is, in a case where the selected two image output devices have a color output function and only the one of the selected two image output devices has a two-sided print function, only the image output mode which can be set is enabled to be set by disabling the operator from performing the setting of the two-sided print (e.g., a two-sided print setting button or the like is deleted from a setting screen to be displayed on the LCD 2013).

In this way, by controlling a display displayed on the operation unit 2012 and an operation performed in the operation unit 2012, a device selection and the setting of the image output mode in case of selecting the plural image output devices and setting the image output mode can be simplified. Furthermore, an erroneous operation performed by the operator can be prevented.

In the image output devices to which the image output control apparatus of the present invention can be adopted, it is assumed that the image output device priority setting can be performed. Hereinafter, an operation setting screen and a screen changing operation in the image output devices of the present embodiment which can perform the above-described cascade copying operation and the image output device priority setting will be explained in detail.

The screen changing in the operation screen of the image output device according to the present invention will be described using a screen displayed on the LCD unit 2013 shown in FIG. 4 with reference to FIGS. 8 to 12.

FIG. 8 is a view showing the operation setting screen of the image output device to which the image output control apparatus of the present invention can be adopted, and this screen corresponds to an initial screen and a standard screen of returning to standard state after setting various image formation functions and is displayed on the LCD unit 2013 in the operation unit 2012 shown in FIG. 4.

In FIG. 8, numeral 3101 denotes a direct (same-sized copying) key which is a software key used for setting a same size output without using a zoom function in an image formation. Numeral 3102 denotes a zoom key which is a software key used for setting the zoom function.

Numeral 3103 denotes a sheet select (or paper select) key which is a software key used for setting the output media (i.e., output sheets). For example, the sheet select key 3103 can be used to set sheet sizes A4, A3, B4, B5, LTR (letter size) and the like. By depressing or touching this key, only the output media (size) capable of being commonly outputted by the image output device selected by a select output device key 3104 is displayed and only the output media (size) capable of being commonly outputted is enabled to be set.

Numeral 3106 denotes a two-sided copy key which is a software key used for setting the two-sided copying. Numeral 3107 denotes a finishing key which is a software key used for setting sorting of the output media. Numeral 3109 denotes a special feature key which is a software key used for setting other practical functions.

After depressing or touching these keys of the zoom key 3102, the sheet selection key 3103, the select output device key 3104, the two-sided copy key 3106, the finishing key 3107 and the special feature key 3109, the display screen is changed to a screen used for setting more detailed functions.

Numeral 3108 denotes a density setting key which is a software key group used for setting image output density. Numeral 3105 denotes a display area where setting status of the image output device selection is displayed.

The image output device of the present invention can perform an output operation to a remote image output device connected through the LAN (called remote copying) or perform the cascade copying. However, as an initial status, it is set to perform the image output operation to its own device (called local copying). The setting status of the image output device selection of performing the local copying, the remote copying or the cascade copying is displayed on the display area 3015.

Figure 9:
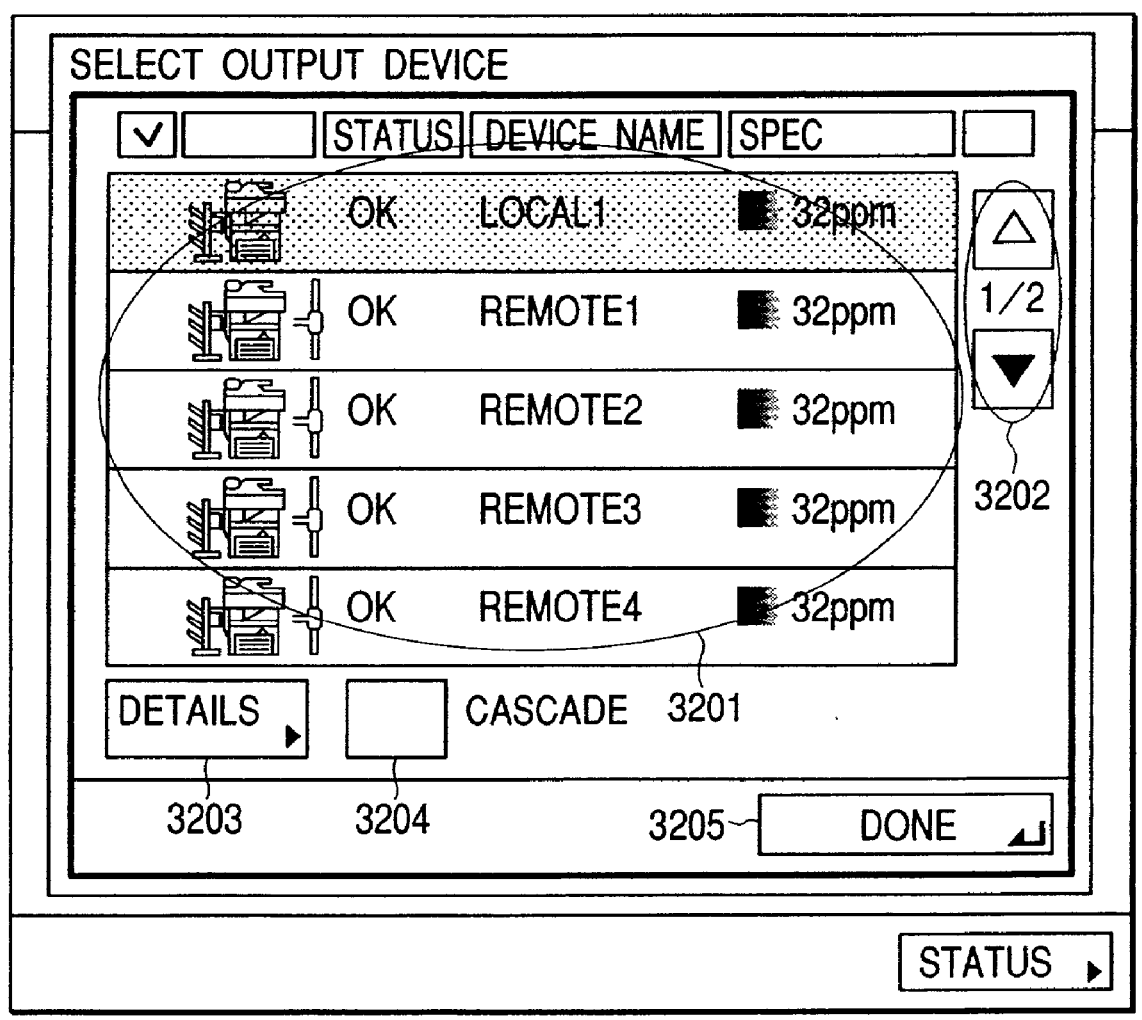
FIG. 9 is a view showing an operation setting screen (output device selection window) of the image output device to which the image output control apparatus of the present invention can be adopted.

FIG. 9 is a view showing the operation setting screen (output device selection window) of the image output device to which the image output control apparatus of the present invention can be adopted. This screen corresponds to a setting screen displayed after depressing or touching the select output device key 3104 shown in FIG. 8 and is used for selecting the image output device. This screen is displayed on the LCD unit 2013 in the operation unit 2012 shown in FIG. 4.

In FIG. 9, numeral 3201 denotes a selectable image output device list, where names of the selectable image output devices, small appearance icons, status, output specification and the like are displayed as a list. The image output devices displayed as the list are separately registered (registering method will not be described). Here, "Local 1" and "Remote 1" to "Remote 4" displayed in a position of "Device Name" within the selectable image output device list 3201 respectively correspond to the image output device 200, the image output devices 220 to 250 indicated in the image formation system shown in FIG. 1.

In the selectable image output devices list 3201, the output device can be directly selected by an operation of a touch panel input. The name of the selected image output device is reversely displayed. Status shown in FIG. 9 is a default status in which a local image output device displayed on the uppermost position in the list is selected and is reversely displayed.

Numeral 3204 denotes a cascade key. By depressing or touching this key, the two image output devices in the list can be selected as the output devices for the cascade copying, and check marks are displayed on a left-edge field of the names of the selected image output devices (refer to FIG. 10 to be described later).

Numeral 3203 denotes a details key which is a software key used for referring a detailed specification of the image output device of which name is selected and reversely displayed. By depressing or touching this software key, the screen is changed to another screen, where the detailed specification of the image output device is displayed.

Numeral 3202 denotes a scroll key which is a software key used for page scrolling the selectable image output device list. Numeral 3205 denotes a done key which is a software key used for defining the selection of the image output device.

Figure 10:
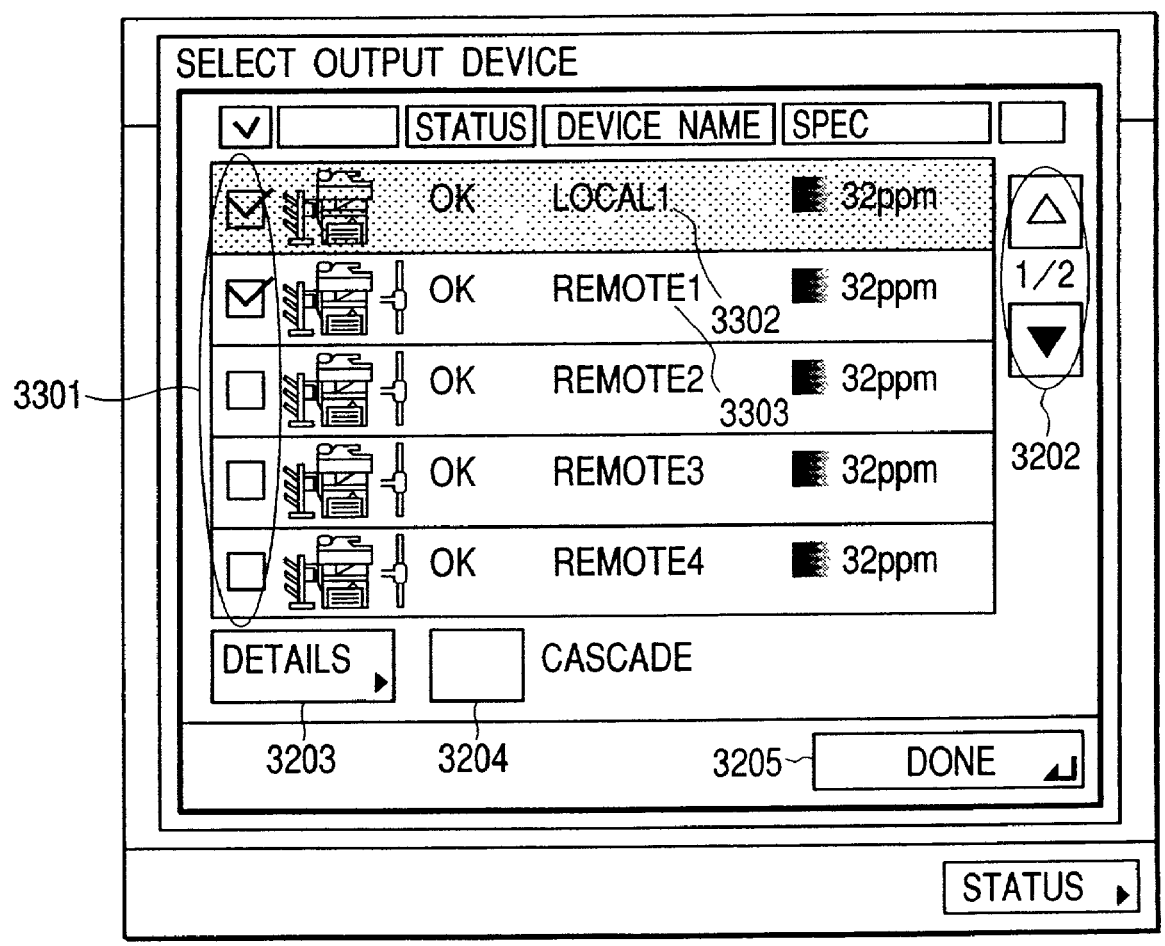
FIG. 10 is a view showing the operation setting screen (output device selection window) of the image output device to which the image output control apparatus of the present invention can be adopted.

FIG. 10 is a view showing an operation setting screen (output device selection window) of the image output device to which the image output control apparatus of the present invention can be adopted. This screen corresponds to a setting screen after depressing the cascade key 3204 on the setting screen shown in FIG. 9. The check marks are displayed on the left-edge field 3301 of a numeral 3302 being the image output device displayed on the uppermost position in the list and a numeral 3303 being the image output device displayed on a second upper position in the list. In FIG. 10, the same parts as those in FIG. 9 are provided with the same numerals respectively.

When the cascade key 3204 is depressed or touched, the image output devices indicated by the numerals 3302 and 3303 are selected as default image output devices in case of performing the cascade copying.

Then, when the cascade key 3204 is once depressed, it is shifted to a setting mode of selecting the image output device used for the cascade copying, and its own device being the image output device of which name is displayed on the uppermost position in the list and the other optional one image output device can be selected.

In order to indicate a setting mode of setting the image output device used for the cascade copying, as to the image output devices having no check mark, icons are to be displayed as shown in the field 3301.

Figure 11:
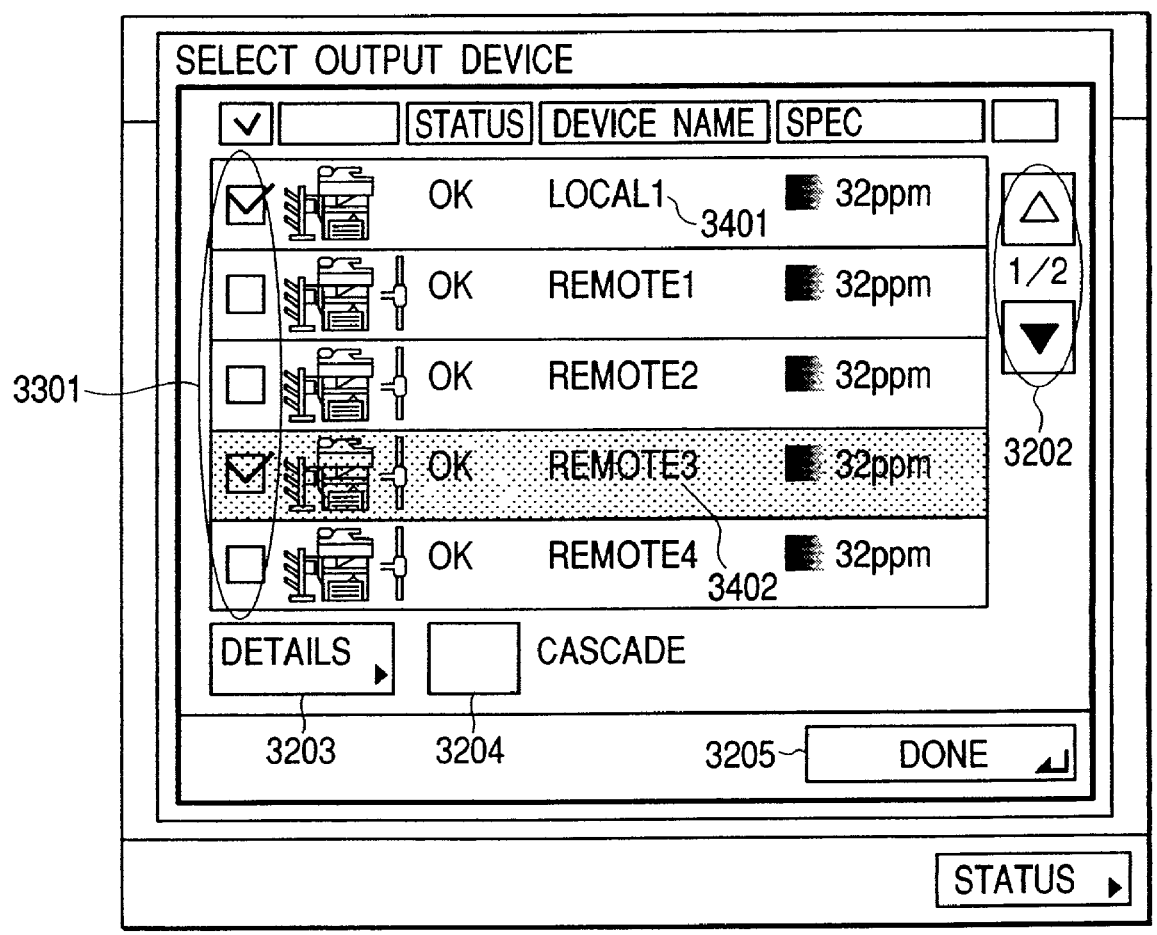
FIG. 11 is a view showing the operation setting screen (output device selection window) of the image output device to which the image output control apparatus of the present invention can be adopted.

FIG. 11 is a view showing the operation setting screen (output device selection window) of the image output device to which the image output control apparatus of the present invention can be adopted. This screen corresponds to a setting screen after selectively depressing or touching an icon of the image output device displayed on fourth upper position in the list on the setting screen shown in FIG. 10, and the check marks are displayed on the left-edge field 3301 of the image output devices indicated by the numerals 3401 and 3402. In FIG. 11, the same parts as those in FIGS. 9 and 10 are added with the same numerals respectively.

In a case where the output media of which size is common to the image output devices indicated by the numerals 3401 and 3402 do not exist, when the done key 3205 is depressed or touched, a warning display screen shown in FIG. 12 explained later is displayed.

Figure 12:
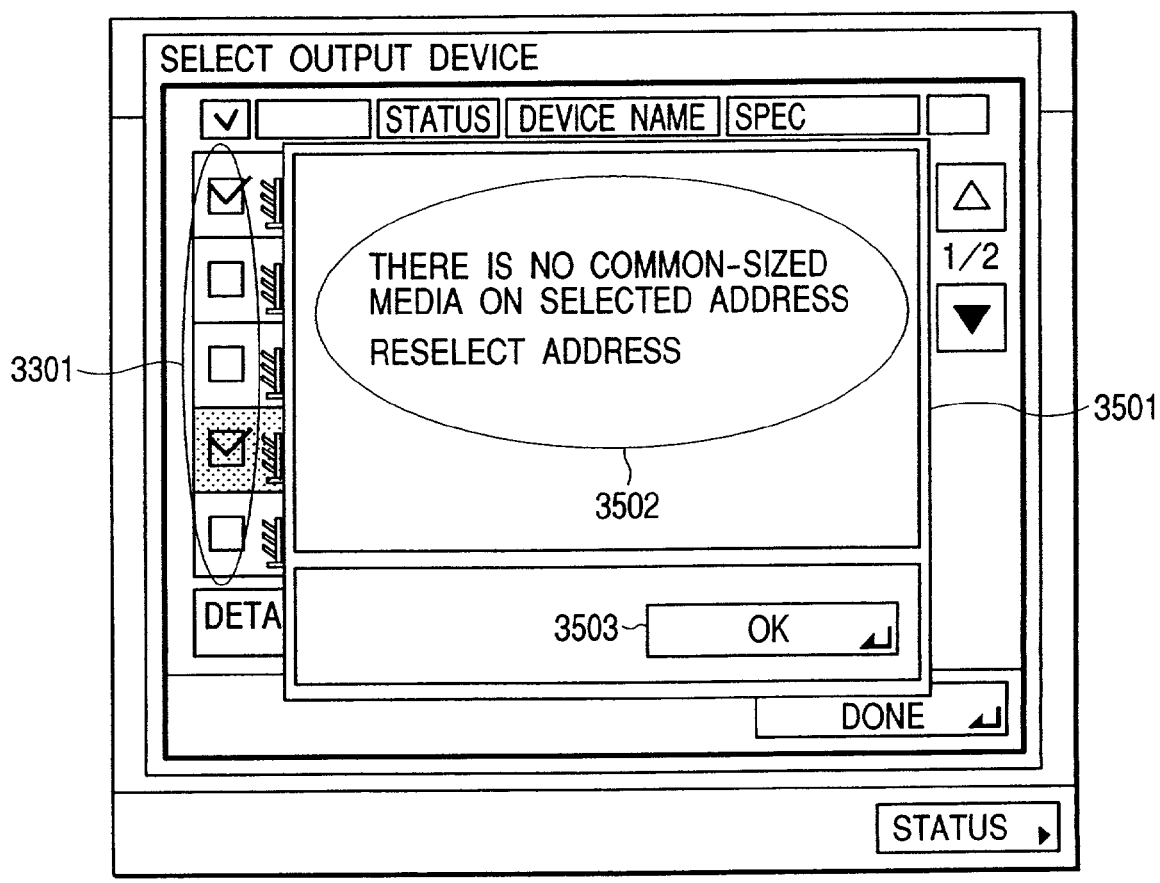
FIG. 12 is a view showing a warning display screen (warning window) of the image output device to which the image output control apparatus of the present invention can be adopted.

FIG. 12 is a view showing the warning display screen (warning window) of the image output device to which the image output control apparatus of the present invention can be adopted. This screen corresponds to a screen after depressing or touching an icon of the image output device displayed on a fourth upper position in the list on the setting screen shown in FIG. 11, and the check marks are displayed on the left-edge field 3301 of the image output devices indicated by the numeral 3401 and 3402.

On this screen, a warning window 3501 is displayed superimposed on an image output device selection window. Numeral 3502 denotes a warning message which notifies that the output media of which size common to the selected image output devices do not exist to the operator and recommends a reset.

Numeral 3503 denotes an OK key. By depressing or touching this key, the warning window 3501 is closed to return to the setting screen shown in FIG. 11, and a reset (reselection of the output device) can be performed.

As above, as shown in FIGS. 8 to 12, the operation unit 2012 has the LCD unit 2013 for displaying image formation function information when the cascade copying is performed and information related to the plural image output devices which can output images. By performing an operation input using the touch panel 2019 or various keys 2014 to 2017 by the operator on the basis of the information displayed on the LCD unit 2013, the image output mode and the plural image output devices for outputting images can be selected.

Hereinafter, a screen change processing operation of the operation setting screens shown in FIGS. 8 to 12 will be explained with reference to flow charts shown in FIGS. 13 to 15.

Figure 13:
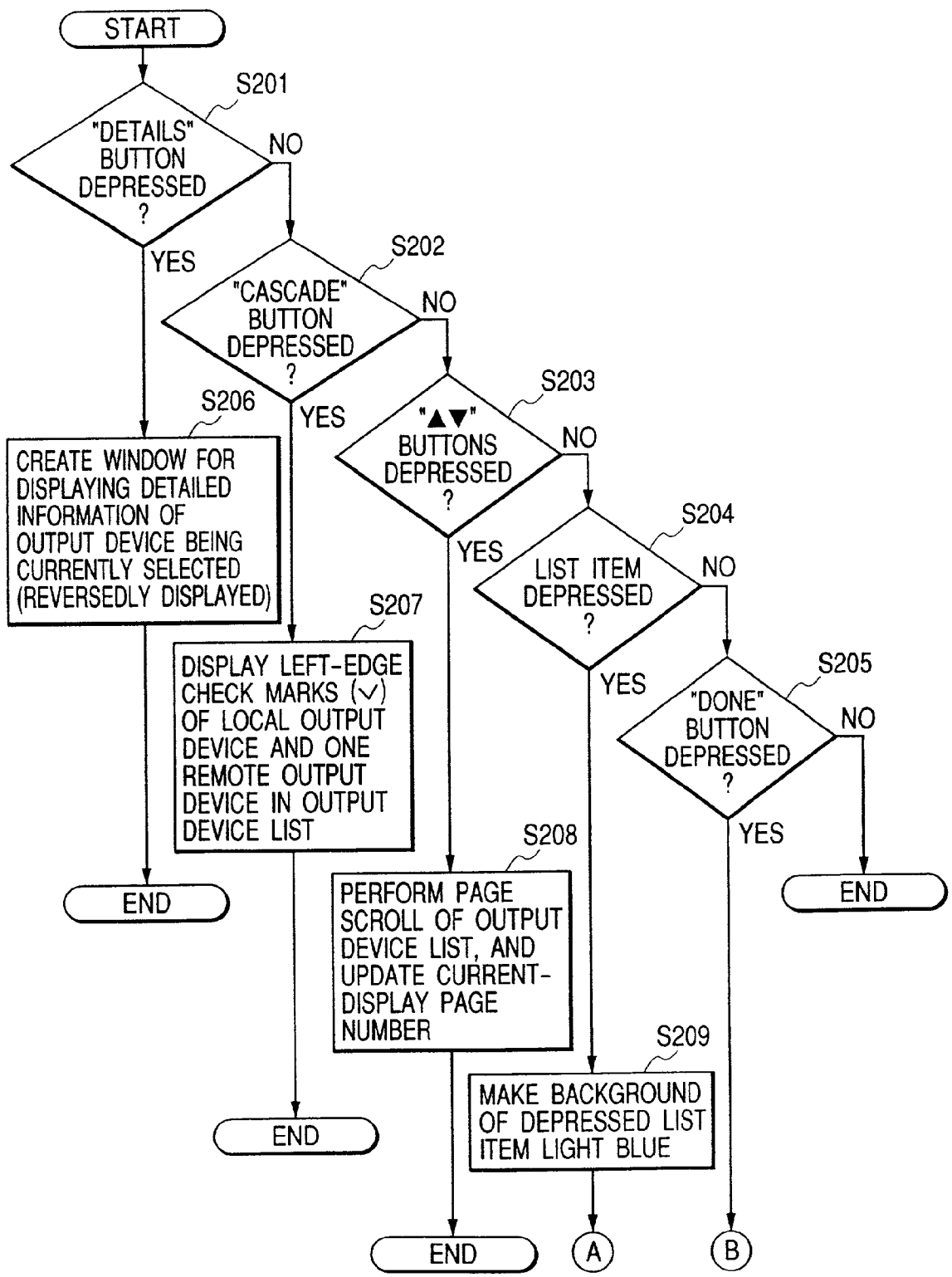
FIG. 13 is a flow chart showing one example of second control processing executed in the image output device to which the image output control apparatus of the present invention can be adopted.
Figure 14:
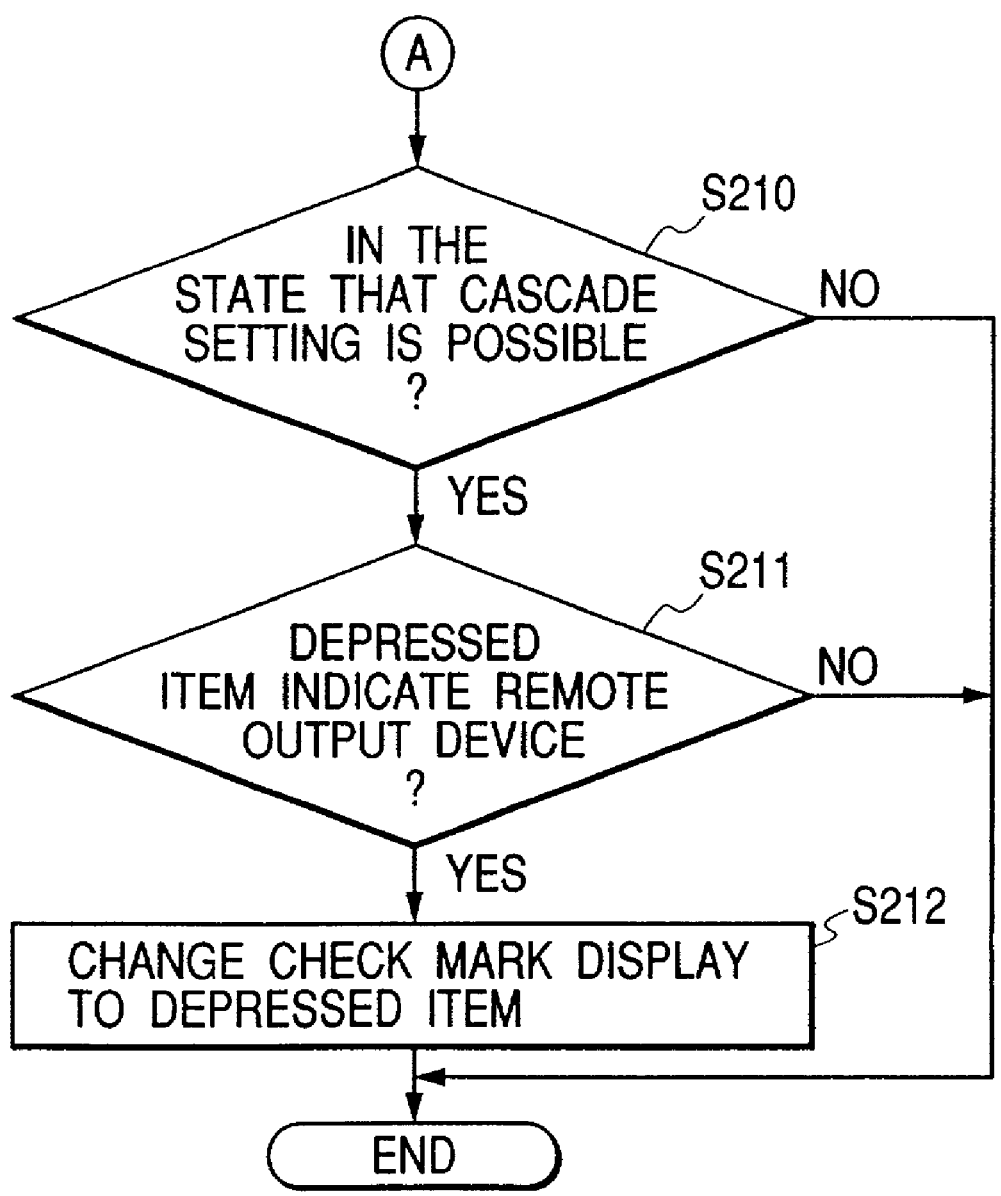
FIG. 14 is a flow chart showing one example of the second control processing executed in the image output device to which the image output control apparatus of the present invention can be adopted.
Figure 15:
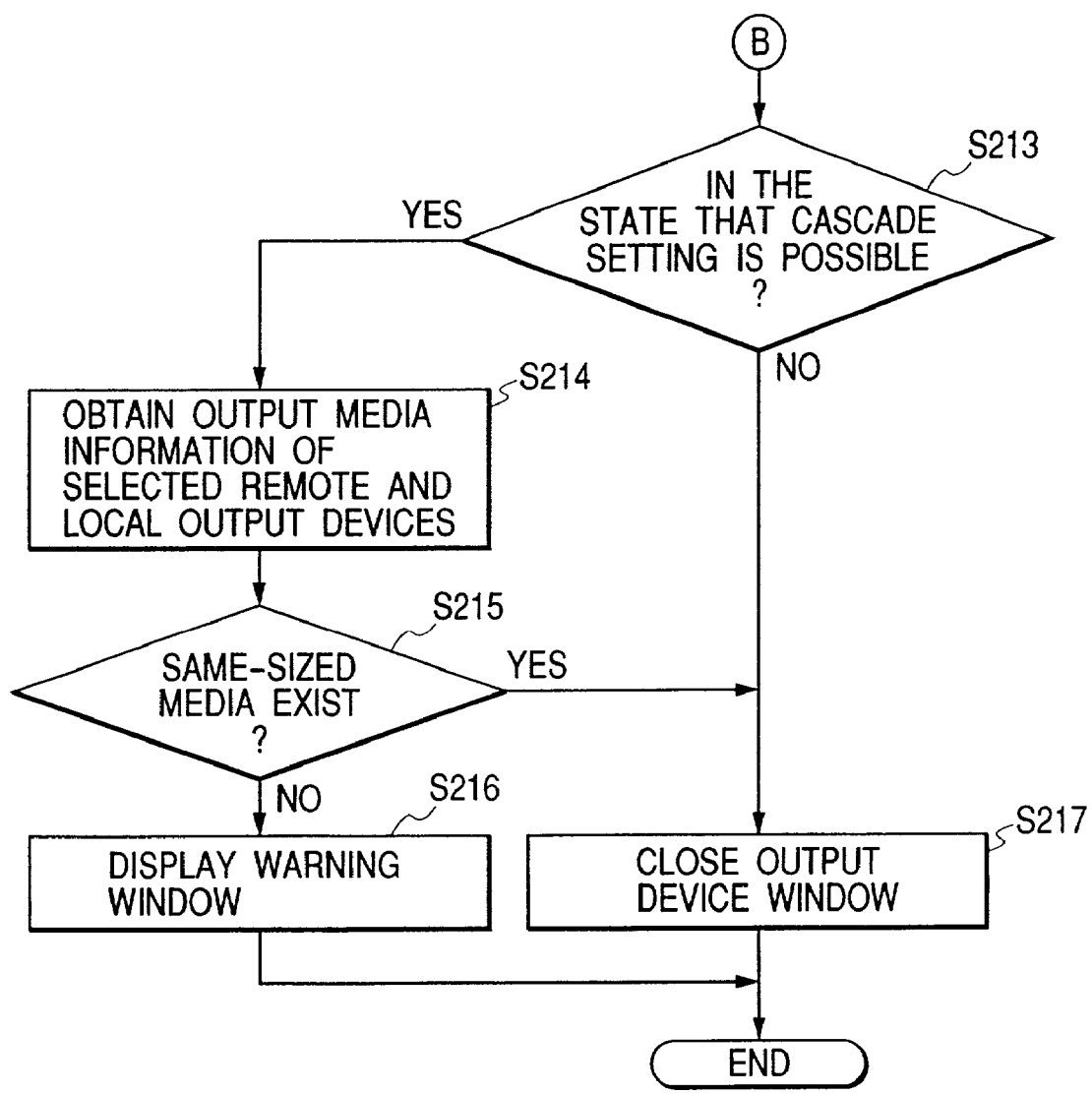
FIG. 15 is a flow chart showing one example of the second control processing executed in the image output device to which the image output control apparatus of the present invention can be adopted.

FIGS. 13 to 15 are flow charts showing one example of second control processing executed in the image output devices to which the image output control apparatus of the present invention can be adopted. It should be noted that, as described above, since the image output device priority setting is performed in the present embodiment, the image output mode is not set when this second control processing is started. The CPU performs the processing on the basis of the programs stored in the ROM 2003 or another storage medium (not shown) corresponding to one example of a screen change processing procedure of the operation setting screen. Reference symbols S201 to S217 respectively indicate steps.

At first, in the step S201, it is judged whether or not an input event is the depressing or touching of the details key ("Details" button) 3203. When it is judged that the input event is the depressing or touching of the details key ("Details" button) 3203, in the step S206, a window (not shown) for displaying detailed information of the image output device being currently selected is created and displayed, and processing of the callback function is terminated. On the other hand, in the step S201, when it is judged that the input event is not the depressing or touching of the details key ("Details" button) 3203, it is judged whether or not the input event is the depressing or touching of the cascade key ("Cascade" button) 3204 in the step S202. When it is judged that the input event is the depressing or touching of the cascade key ("Cascade" button) 3204, in the step S207, the check marks are displayed on the left-edge field 3301 of the local image output device and the one remote image output device in the image output device list 3201, and the processing of the callback function is terminated.

On the other hand, in the step S202, when it is judged that the input event is not the depressing or touching of the cascade key ("Cascade" button) 3204, it is judged whether or not the input event is the depressing or touching of the scroll key (scroll button) 3202 in the step S203. When it is judged that the input event is the depressing or touching of the scroll key (scroll button) 3202, in the step S208, the image output device list 3201 is page scrolled and displayed to update a page number currently displayed, and the processing of the callback function is terminated.

On the other hand, in the step S203, when it is judged that the input event is not the depressing or touching of the scroll key (scroll button) 3202, it is judged whether or not the input event is the depressing or touching of an item in the image output device list 3210 in the step S204. When it is judged that the input event is the depressing or touching of the item in the image output device list 3201, in the step S209, a background of the depressed or touched list item is displayed in light blue (so called a reversely display), and the flow advances to the step S210.

Next, in the step S210, it is judged whether or not cascade setting is in a possible state. When it is judged that the cascade setting is not in the possible state (in the impossible state), the processing of the callback function is terminated as it is.

On the other hand, in the step S210, when it is judged that the cascade setting is in the possible state, it is judged whether or not the depressed or touched item is the remote image output device (device capable of performing remote copying) in the step S211. When it is judged that the depressed or touched item is not the remote image output device, the processing of the callback function is terminated as it is.

On the other hand, in the step S211, when it is judged that the depressed or touched item is the remote image output device, a check mark display is changed to be displayed on the depressed list item in the step S212, and the processing of the callback function is terminated.

On the other hand, in the step S204, when it is judged that the depressed or touched item is not the remote image output device, it is judged whether or not the input event is the depressing or touching of the done key ("Done" button) 3205 in the step S205. When it is judged that the depressed or touched input event is not the depressing or touching of the done key ("Done" button) 3205, the processing of the callback function is terminated as it is.

On the other hand, in the step S205, when it is judged that the depressed or touched input event is depressing or touching of the done key ("Done" button) 3205, it is judged whether or not the cascade setting is in the possible state in the step S213.

In the step S213, when it is judged that the cascade setting is in the possible state, the CPU 2001 obtains output media information of the local image output device being its own device and further obtains output media information of the selected remote image output device through the network interface 2010 in the step S214. The output media information is not limited to information related to what size and what kind of the output media are distributed to and held in the each cassette stage but may include information of that no output media is held in the each cassette stage.

In the step S215, it is judged whether or not the output media of which size is common to the selected local output device and remote output device exist on the basis of the output media information obtained in the step S214. In this judgment, in a case where the selected two image output devices do not have the cassette stage which can hold the same-sized (common-sized) output media or in a case where even if the selected two image output devices have the cassette stage which can hold the same-sized output media, the one of the image output devices does not have that size output media, it is judged that the same-sized output media do not exist.

In the step S215, when it is judged that the same-sized output media do not exist, a window of giving a warning that the same-sized output media do not exist in the selected local image output device and remote image output device and recommending the reselection (the warning window 3501 shown in FIG. 12) is displayed in the step S214, and the processing of the callback function is terminated.

At this time, it may be structured that the selection of the plural image output devices for performing the cascade copying selected by depressing or touching the item in the image output device list 3201 is canceled.

On the other hand, in the step S215, it is judged that the same-sized output media exist, a window for setting the image output device (the output device selection window shown in FIGS. 9 and 11) is closed in the step S217, and the processing of the callback function is terminated.

It should be noted that when the callback function is terminated, the same-sized output media which are commonly held by the plural image output devices for performing the cascade copying may be displayed.

On the other hand, in the step S213, when it is also judged that the cascade setting is not in the possible state (impossible state of the cascade connection), the window for setting the image output device (the output device selection window shown in FIGS. 9 and 11) is closed in the step S217, and the processing of the callback function is terminated.

As above, the control processing in the present embodiment was explained. Obtaining processing of the output media information executed in the step S214 is not limited to the structure of directly obtaining the information through a network but may be structured that, for example, the output media information is previously stored in the HDD 2004 or the like and the output media information is captured from the HDD 2004 or the like in accordance with the termination of the processing executed in the step S213.

As explained above, in the present embodiment, in operation setting based on the image output device priority setting when the cascade copying is performed, the output media information of the selected image output device is obtained when the plural image output devices for outputting images are defined. On the basis of the obtained output media information, it is judged whether or not the selected plural image output devices have the same-sized output media. When it is judged that the plural image output devices do not have the same-sized image output media, this fact is to be notified to the operator by displaying the fact on a display as a window.

Accordingly, the operator can recognize whether or not images can be outputted by the fact that the plural image output devices for outputting the images have or do not have the same-sized output media before the operator performs various setting operations such as the image output mode setting and the like.

Second Embodiment

In the first embodiment, in the image output devices to which the image output control apparatus of the present invention can be adopted, the structure of displaying the window for notifying the warning (the warning window shown in FIG. 12) in case of not the same-sized output media not existing when the cascade copying is performed, was explained.

However, the present invention is applicable to not only a case of executing display control processing based on the presence or absence of the same-sized image output media but also a case of executing display control processing based on the presence or absence of the same-kind (common kind) of the image output media. In the present embodiment, display control processing based on the size and kind of the image output media will be explained.

The hardware structure of an image formation system and an image formation apparatus in the present embodiment is same as that in the first embodiment, and also it is assumed that when the cascade copying is performed, setting based on the image output device priority setting is executed. Hereinafter, the structure of an operation setting screen and a screen changing operation in the present embodiment different from those in the first embodiment will be mainly explained.

In the image output devices of the present embodiment, the output media selection (Paper Select) key 3103 shown in FIG. 8 can set not only the size of output media but also the kind of output media (a normal sheet, a thick sheet, a thickest sheet, a thin sheet, an OHP (overhead projector) film, color sheets (red, blue, yellow, black, etc.), a specific sheet, and the like).

By depressing or touching the key 3103, only the output media (size and kind) capable of being commonly outputted by the image output devices selected by depressing or touching the image output device selection key 3104 is displayed, and only the image output media (size and kind) capable of being commonly outputted is enabled to be set.

The operation setting screens regarding an operation of the cascade copying in the present embodiment are the same as those shown in FIGS. 8 to 11 indicated in the first embodiment, and the screen change processing procedure also corresponds to that in the above operation setting screens it is the same as the processing in the second control processing indicated by the flow charts shown in FIGS. 13 and 14.

However, in the present embodiment, processing regarding the image output media after depressing or touching the done key ("Done" button) 3205 shown in FIG. 11 is different from that in the first embodiment. A screen change processing procedure corresponding to the processing in the present embodiment will be explained with reference to FIG. 16.

Figure 16:
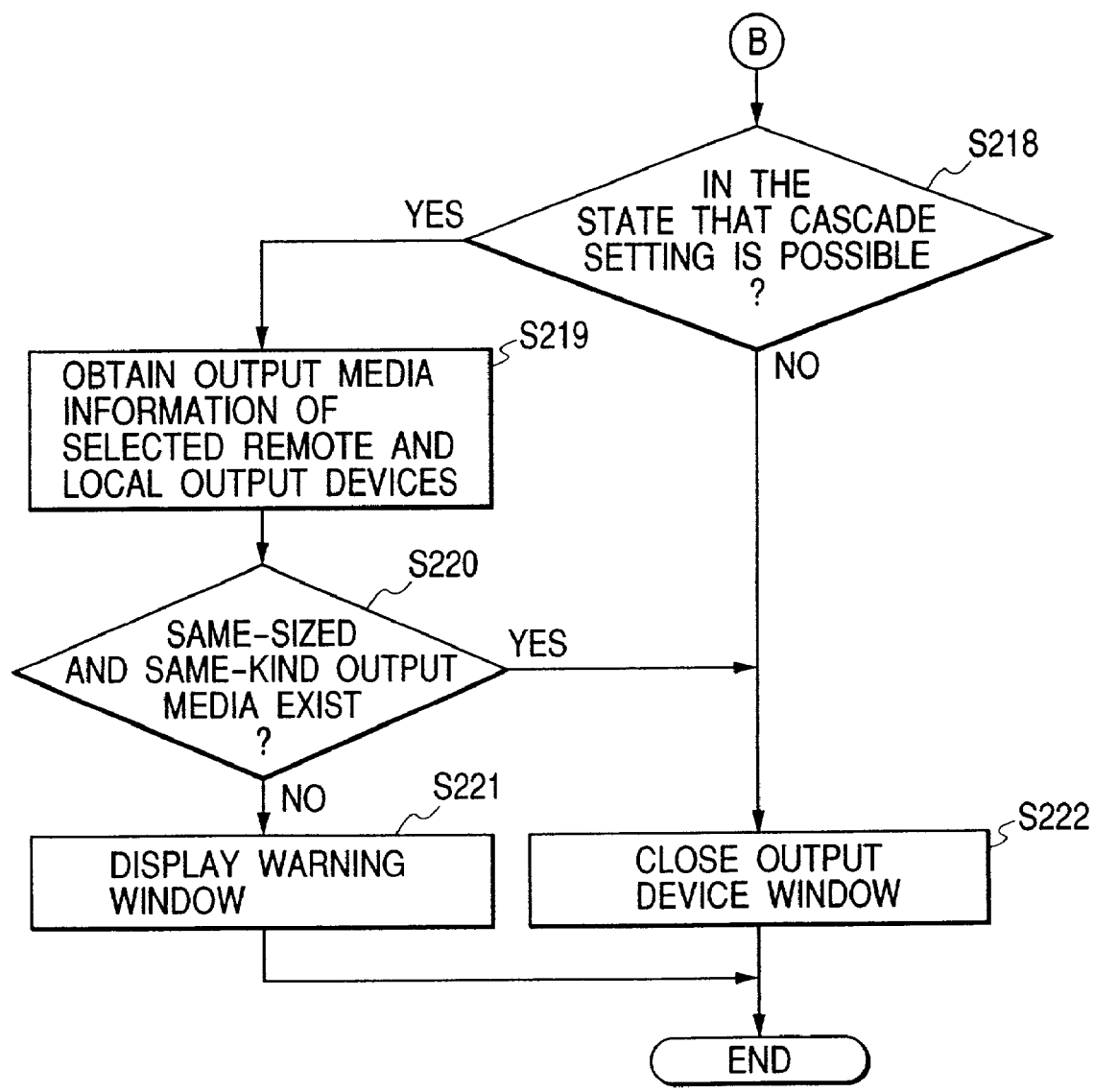
FIG. 16 is a flow chart showing one example of third control processing executed in the image output device to which the image output control apparatus of the present invention can be adopted.

FIG. 16 is a flow chart showing one example of third control processing executed in the image output devices to which the image output control apparatus of the present invention can be adopted. The CPU 2001 executes this processing on the basis of programs stored in the ROM 2003 or another storage medium (not shown). Reference symbols S218 to S222 respectively indicate steps.

At first, similar to the first embodiment, in the step S218, it is judged whether or not the cascade setting is in the possible state. When it is judged that the cascade setting is in the possible state, the CPU 2001 obtains output media information of the local image output device being its own device and the remote image output device in the step S219.

Here, the output media information is not limited to information related to what size and what kind of output media are distributed to and held in the each cassette stage but may include information of no output media is held in the each cassette stage.

In the step S220, it is judged whether or not the output media of which the size and kind are common to the selected local image output device and remote image output device exist on the basis of the output media information obtained in the step S219. In this judgment, in a case where the selected two image output devices do not have the cassette stage which can hold the same-sized and same-kind output media or in a case where even if the selected two image output devices have the cassette stage which can hold the same-sized and same-kind output media, the one of the image output devices does not have that output media, it is judged that the same-sized and same-kind output media do not exist.

In the step S220, when it is judged that the same-sized and same-kind output media do not exist, a window of giving a warning that the same-sized and same-kind output media do not exist in the selected local image output device and remote image output device and recommending the reselection is displayed, and the processing of the callback function is terminated in the step S221. In the step S212, although a screen displayed on the LCD unit 2013 is not shown, a message of "There is no same-sized and same-kind output media on selected address. Reselect address" is displayed.

At this time, it may be structured that the selection of the plural image output devices for performing the cascade copying selected by depressing or touching an item in the image output device list 3201 is canceled.

On the other hand, in the step S220, when it is judged that the same-sized and same-kind output media exist, a window for setting the image output devices (the image output device selection window shown in FIGS. 9 and 11) is closed in the step S222, and the processing of the callback function is terminated.

It should be noted that when the callback function is terminated, the same-sized and same-kind output media commonly held by the plural image output devices for performing the cascade copying may be displayed.

On the other hand, in the step S218, when it is judged that the cascade setting is not in the possible state (impossible state of the cascade connection), a window for setting the image output devices (image output device selection window shown in FIGS. 9 and 11) is closed in the step S222, and the processing of the callback function is terminated.

In the present embodiment, a display control based on the size and kind of output media has been explained. However, it is needless to say that the present invention is not limited to this case but may be structured such that the warning is given only when the same-kind output media does not exist without regard to the size of output media and the selection of the image output devices is canceled.

As explained above, in the present embodiment, in the operation setting based on the image output device priority setting when the cascade copying is performed, the output media information of the selected each image output device is obtained when the plural image output devices for outputting images are defined. On the basis of the obtained output media information, it is judged whether or not the selected plural image output devices have the same-sized and same-kind output media. When it is judged that the plural image output devices do not have the same-sized and same-kind output media, this fact is to be notified to the operator by displaying the fact on a display as a window.

Accordingly, the operator can recognize whether or not images can be outputted due to the fact that the plural image output devices for outputting the images have or do not have the same-sized and same-kind output media before the operator performs various setting operations such as the image output mode setting and the like.

Third Embodiment

In the operation setting when the cascade copying is performed, the image output device priority setting was performed in the first and second embodiments. In the image output device priority setting, at first, the image output devices for performing the cascade copying have to be defined.

Therefore, after the operator depressed or touched the done key ("Done" button) 3205 in the step S205 shown in FIG. 13, it is shifted to processing regarding the output media such as the second control processing shown in FIG. 15 or the third control processing shown in FIG. 16.

However, according to the structure or state of an image formation system, the image output devices for performing the cascade copying are sometimes defined before depressing the done key ("Done" button) 3205.

For example, among the plural image output devices structuring the image formation system, if only the two image output devices which can perform the cascade copying exist, since only the one selectable combination of the devices exist at a timing after depressing the cascade key ("Cascade" button) and before depressing the done key ("Done" button) 3205, the two image output devices for outputting images are automatically selected, and the image output devices for performing the cascade copying are defined.

However, in the control processing of the first and second embodiments, also in the above-described situation, it is shifted to the processing regarding the output media in accordance with the depression of the done key ("Done" button) 3205 performed by the operator.

Therefore, in a case where the same-sized or same-kind output media does not exist in the two devices, the various setting operations performed by the operator after the depression of the cascade key ("Cascade" button) until the depression of the done key ("Done" button) 3205 result in the wasted operation.

In the present embodiment, in order to prevent the above-described wasted operation, it is structured that the immediate shifting to the processing regarding the output media after depression of the cascade key ("Cascade" button) can be performed.

In the present embodiment, in the same image formation system as that in the first and second embodiment shown in FIG. 1, an operation setting screen and a screen changing operation in case of assuming that a situation of having only the two image output devices which can perform the cascade copying may occur will be explained with reference to FIG. 17.

Figure 17:
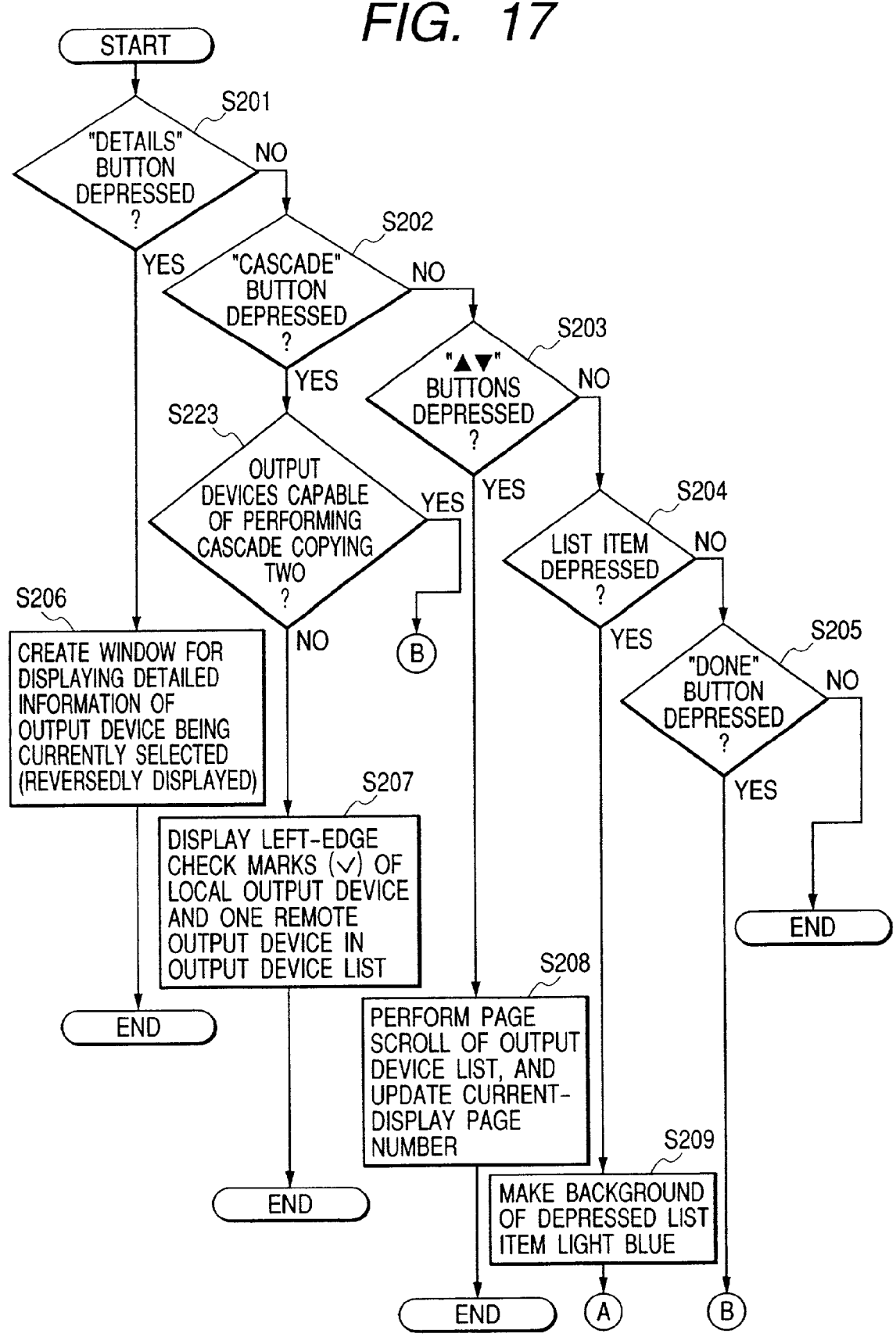
FIG. 17 is a flow chart showing one example of fourth control processing executed in the image output device to which the image output control apparatus of the present invention can be adopted.

FIG. 17 is a flow chart showing one example of fourth control processing executed in the image output device to which the image output control apparatus of the present invention can be adopted. The CPU 2001 executes this processing on the basis of the programs stored in the ROM 2003 and another storage medium in accordance with one example of an image change processing procedure in the operation setting screens shown in FIGS. 8 to 11. Reference symbols S201 to S209 and S223 respectively indicate steps.

Here, the steps executing the same processing as those in the first and second embodiments are indicated by the same reference symbols, and the description thereof will be omitted. With respect to the flow in the step S209 in FIG. 17, it advances to the step S210 shown in FIG. 14. With respect to the flow in the step S205 in FIG. 17, it advances to the step S218 shown in FIG. 16.

In the present embodiment, processing after depressing the cascade key ("Cascade" button) in the step S202 is different from that executed in the first and second embodiments.

In the present embodiment, after depressing the cascade key ("Cascade" button), it is judged whether or not the two image output devices which can perform the cascade copying exist in the step S223. When it is judged that the two or more than two image output devices exist, the flow advances to the step S207, where the same processing as that in the first and second embodiments is executed.

In the step S223, when it is judged that the two image output devices exist, in the present embodiment, the flow immediately advances to the step 213 and the following steps where the processing regarding the output media is executed.

With respect to the processing executed after the step S213, since the same processing as that in the first embodiment (second control processing shown in FIG. 15) or the second embodiment (third control processing shown in FIG. 16) is executed, the description will be omitted.

As explained above, in the present embodiment, it is judged whether or not the two image output devices which can perform the cascade copying exist in accordance with an instruction of the cascade copying (depression of the "Cascade" button) given by the operator. When it is judged that the two image output devices exist, since it is possible to immediately judge whether or not the same-sized and the same-kind output media exist, the trouble of various operation settings (Step S201, Steps S203 to S205) can be saved and more simple operation setting can be achieved.

Fourth Embodiment

In the first to third embodiments, the present invention was explained in a case that the cascade copying is performed by adopting the image output control apparatus of the present invention to the image output device 200 included in the image formation system shown in FIG. 1.

However, the present invention is not limited to use in the image output device. Particularly, in an image formation system structured by a PC and the plural image output devices, in case of executing dispersive print processing in which the PC is treated as a host computer, the control processing as explained in the first to third embodiments can be executed by applying the present invention to the PC.

In the present embodiment, with respect to a case that the dispersive print processing is executed on the basis of data generated in the PC by applying the present invention to the image formation system which includes the PC shown in FIG. 18, the present invention will be explained.

Figure 18:
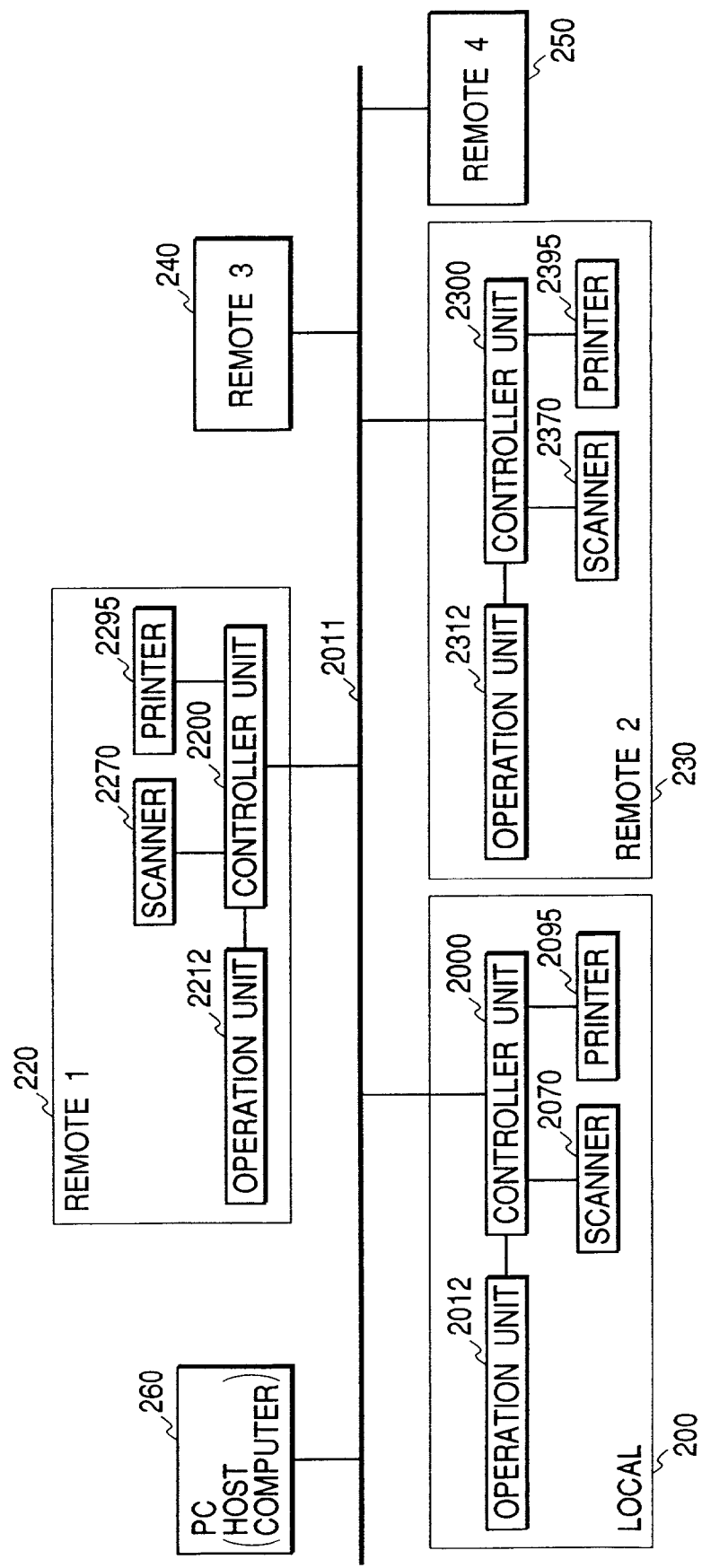
FIG. 18 is a block diagram showing an entire structure of the image formation system including a PC to which the present invention is applicable.

In FIG. 18, the image output devices 200 to 250 have the same structure as that of the image output devices in the first to third embodiments.

A PC 260 can communicate with the image output devices 200 to 250 through the LAN 2011 and can obtain device information (output media information, device information or the like) of the image output devices. The PC 260 can instruct print processing based on data generated by or stored in the PC 260 to the image output devices 200 to 250.

For example, in case of printing out image data edited by the PC on the plural numbers of copies, the dispersive print processing of causing the image output devices 200 and 220 to perform the dispersive print of dispersively outputting images on the set numbers of copies can be executed.

Also, in case of the operation setting of the dispersive print processing, the plural image output devices for outputting images have to be selected and the image output mode such as various image output functions and the like have to be set using a display and a keyboard of the PC. In the present embodiment, the device selection and setting of the image output mode depend on the before described image output device priority setting.

The control programs of the above-described dispersive print processing and the image output device priority setting are previously stored in a HDD built in the PC 260. These programs are loaded to a memory in the PC 260 in accordance with an instruction from the operator and are executed.

In the present embodiment, different from the case in the first to third embodiments, since the dispersive print processing in which the PC is treated as the host computer is executed, the control processing for the setting screen and the screen change based on the image output device priority setting are slightly different from those shown in FIGS. 8 to 11, 13 and 14. But, the description will be omitted here.

However, the processing (step S205 shown in FIG. 13) of specifying the plural image output devices for outputting images in accordance with an input operation performed to the keyboard by the operator is always included in this control processing. Similar to the first to third embodiments, it is shifted to the processing regarding the output media in accordance with the depression of the done key ("Done" button).

Hereinafter, the processing regarding the output media after depressing the done key ("Done" button), before the above-described dispersive print processing and the programs of the control processing fort the image output device priority setting were executed, will be explained.

Figure 19:
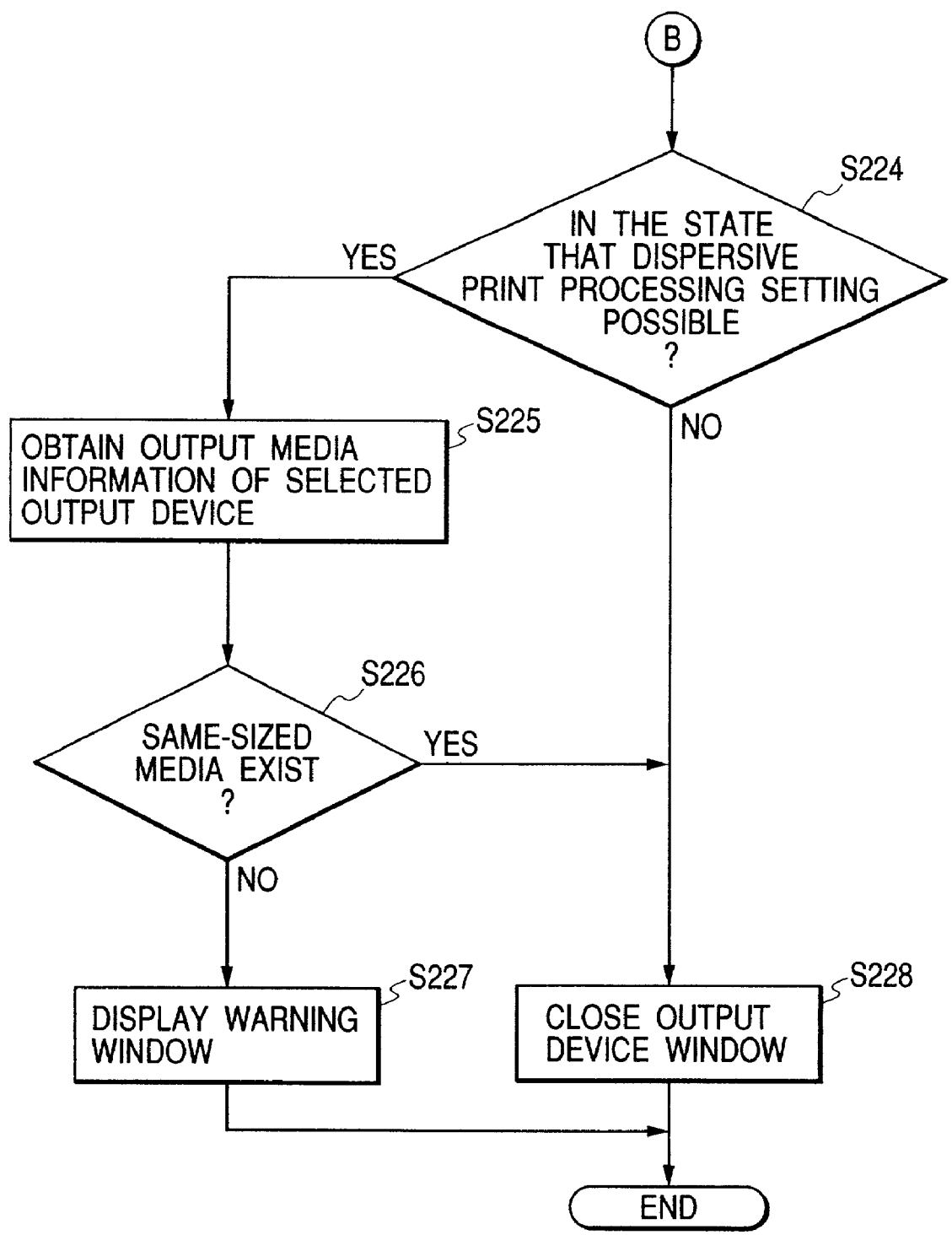
FIG. 19 is a flow chart showing one example of control processing executed by the PC to which the present invention is applicable.

FIG. 19 is a flow chart showing one example of control processing executed by the PC to which the present invention is applicable. This processing is executed by the CPU built in the PC based on the programs stored in the built-in HDD. Reference symbols S224 to S228 respectively indicate steps.

At first, similar to the case of the first embodiment, in the step S224, it is judged whether or not setting of the dispersive print processing is in the possible state. When it is judged that the setting of the dispersive print processing is in the possible state, the CPU built in the PC obtains output media information of the selected image output device in the step S225.

Here, the output media information is not limited to information related to what size and what kind of output media are distributed to and held in the each cassette stage but may include information that no output media is held in the each cassette stage.

In the step S226, it is judged whether or not the same-sized output media exist in the selected image output device on the basis of the output media information obtained in the step S225. In this judgment, in a case where the selected two image output devices do not have the cassette stage which can hold the same-sized output media or in a case where even if the selected two image output devices have the cassette stage which can hold the same-sized output media, one of the image output devices does not have that output media, it is judged that the same-sized output media do not exist.

In the step S226, when it is judged that the same-sized output media do not exist, a window of giving a warning that the same-sized output media do not exist in the selected two image output devices and recommending the reselection is displayed in the step S227, and the processing of the callback function is terminated. Although a screen to be displayed in the step S227 is not shown, it may be the same warning screen as that shown in FIG. 12.

At this time, it may be structured that the selection of the plural image output devices for performing the cascade copying selected by depressing or touching the item in the image output device list 3201 is canceled.

As above, the present invention was explained in a case that the dispersive print processing based on data generated in the PC is executed by applying the present invention to the image formation system including the PC shown in FIG. 18. However, it is needless to say that it may be structured that the dispersive print processing is to be executed by treating a device other than the PC as a host computer.

For example, it may be structured that image data obtained by scanning originals is stored in the HDD 2004 in the image output device 200 in which the plural image output devices are selected, and the dispersive print processing can be executed using the selected image output devices on the basis of the stored image data.

It is not required to structure such that the dispersive print processing is controlled by only the one device. For example, it may be structured such that a print server (not shown) is to be equipped with a printer automatic selection function, a printer information obtaining function and the like, and the PC is to be equipped with the function for performing only the various settings and displaying when the dispersive print processing is executed.

As explained above, according to the present invention, a control processing program based on the present invention is to be previously stored in the PC, and the program is to be executed when the dispersive print processing is executed. Accordingly, also in the dispersive print processing, the operator can recognize whether or not images can be outputted due to the fact that the plural image output devices for outputting the images have or do not have the same-sized output media before the operator performs various setting operations such as the image output mode setting and the like.

Hereinafter, the structure of a data processing program which can be read by the image output device or the PC according to the present invention will be explained with reference to a memory map shown in FIG. 20.

FIG. 20 is a view for explaining the memory map of a storage medium for storing various data processing programs which can be read by the image output device or the PC to which the present invention is applicable.

Although it is not shown in FIG. 20, a case that information for managing program groups to be stored in a storage medium (not shown) such as version information, creators or the like is also stored, and information which depends on an OS (Operating System) or the like at a side of reading the programs such as icons or the like for discriminatingly displaying the programs is also stored, is sometimes recognized.

Furthermore, data depending on various programs is also managed based on the above-described directory. When a program or data to be installed is compressed, a case that an expanding program is also stored is sometimes recognized.

The functions shown in the task structural view in FIGS. 6, 7 and 13 to 19 according to the present embodiments may be performed by a host computer based on programs installed from an external. In this case, the present invention is also applicable to a case that information groups including programs are supplied to the output devices by a storage medium such as a CD-ROM, a flash memory, an FD (floppy disk) or the like or from an external storage medium through a network.

As above, it is needless to say that an object of the present invention can be achieved in a case where a storage medium storing the program codes of software for realizing the functions of the above-described embodiments is supplied to a system or an apparatus and then a computer (or CPU or MPU) in the system or the apparatus reads and executes the program codes stored in the storage medium.

In this case, the program codes themselves read from the storage medium realize new functions of the present invention, and the storage medium storing such the program codes constitute the present invention.

The storage medium for supplying the program codes can be, for example, a floppy disk, a hard disk, an optical disk, a magnetooptical disk, a CD-ROM, a CD-R, a DVD-ROM, a magnetic tape, a non-volatile memory card, a ROM, an EEPROM, a silicone disk, or the like.

It is needless to say that the present invention also includes not only the case where the functions of the above-described embodiments are realized by the execution of the program codes read by the computer, but also a case where an OS or the like functioning on the computer executes all the processes or a part thereof according to the instructions of the program codes, thereby realizing the functions of the embodiments.

Further, it is needless to say that the present invention includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such the program codes, thereby realizing the functions of the embodiments.

The present invention is applicable to a system composed of plural pieces of equipment or to an apparatus including a single piece of equipment. It is needless to say that the present invention is applicable to a case where the object is achieved by supplying the programs to the system or the apparatus. In this case, the system or the apparatus can accept an effect of the present invention by reading the storage medium storing the programs represented by software for achieving the object of the present invention for the system or the apparatus.

Further, the system or the apparatus can accept an effect of the present invention by downloading the programs represented by the software for achieving the object of the present invention from a data base on a network according to a communication program and reading the programs.

As above, the present invention was explained according to the preferred embodiments. However, the present invention is not limited to the above embodiments, and various modification are possible within the spirit and scope of the appended claims.

What is claimed is:

1. An image output control apparatus adapted to control output of images of input data using plural image output devices, comprising:

mode select means for selecting a cascade outputting mode so that output processing of the input data is allotted to the plural image output devices;

selection means for selecting the plural image output devices that should be used in the cascade outputting mode;

obtaining means for obtaining output media information stored in each image output device of the plural image output devices that are selected to be used in the cascade outputting mode;

judgment means for judging whether or not the plural image output devices store the same-sized output media on the basis of the output media information obtained by said obtaining means, before a user request for causing the plural image output devices to execute an outputting operation for the cascade outputting mode is accepted from a user via a user interface unit;

notification means for causing said user interface unit to provide a judgment result obtained by said judgment means, before the user request is accepted via said user interface unit; and control means for prohibiting a reception of the user request via said user interface unit in a case where the same-sized output media are not stored in the plural image output devices, and permitting the reception of the user request via said user interface unit in a case where the same-sized output media are stored in the plural image output devices.

wherein said control means causes the plural image output devices to execute the outputting operation for the cascade outputting mode after permitting the reception of the user request and accepting the user request via said user interface unit.

2. An apparatus according to claim 1, further comprising a display for displaying information regarding the image output devices, wherein said notification means displays a warning message on the display when said judgment means judges that the plural image output devices selected by said selection means do not have the same-sized output media.

3. An apparatus according to claim 2, wherein it is controlled to cancel selection to be executed by said selection means when said judgment means judges that the plural image output devices selected by said selection means do not have the same-sized output media.

4. An apparatus according to claim 1, wherein said judgment means judges whether or not the plural image output devices selected by said selection means have the same-sized and the same-kind of output media on the basis of the output media information.

5. An apparatus according to claim 4, further comprising a display for displaying information regarding the image output devices, wherein said notification means displays a warning message on the display when said judgment means judges that the plural image output devices selected by said selection means do not have the same-sized and the same-kind of output media.

6. An apparatus according to claim 5, wherein it is controlled to cancel selection to be executed by said selection means when said judgment means judges that the plural image output devices selected by said selection means do not have the same-sized and the same-kind of output media.

7. An apparatus according to claim 1, further comprising input means for inputting image data obtained by reading originals, wherein the plural image output devices can output images of image data inputted by said input means.

8. A control method of an image output control apparatus adapted to control output of images of input data using the plural image output devices, said method comprising the steps of:

selecting a cascade outputting mode so that output processing of the input data is allotted to the plural image output devices;

selecting the plural image output devices that should be used in the cascade outputting mode;

obtaining output media information stored in each image output device of the plural image output devices selected to be used in the cascade outputting mode;

judging whether or not the plural image output devices store the same-sized output media on the basis of the output media information obtained in said obtaining step, before a user request for causing the plural image output devices to execute an outputting operation for the cascade outputting mode is accepted from a user via a user interface unit;

notifying of a judgment result obtained in said judging step; and controlling for prohibiting a reception of the user request via the user interface unit in a case where the same-sized output media are not stored in the plural image output devices, and permitting the reception of the user request via the user interface unit in a case where the same-sized output media are stored in the plural image output devices, wherein controlling means causes the plural image output devices to execute said outputting operation for the cascade outputting mode after permitting the reception of the user request and accepting the user request via said user interface unit.

9. A method according to claim 8, wherein the image output control apparatus has a display for displaying information regarding the image output devices, and said notifying step displays a warning message on the display when said judging step judges that the plural image output devices selected in said selecting step do not have the same-sized output media.

10. A method according to claim 9, wherein it is controlled to cancel selection to be executed in said selecting step when said judging step judges that the plural image output devices selected in said selecting step do not have the same-sized output media.

11. A method according to claim 8, wherein said judging step judges whether or not the plural image output devices selected in said selecting step have the same-sized and the same-kind of output media on the basis of the output media information.

12. A method according to claim 11, wherein the image output control apparatus has a display for displaying information regarding the image output devices, and said notifying step displays a warning message on the display when said judging step judges that the plural image output devices selected in said selecting step do not have the same-sized and the same-kind of output media.

13. A method according to claim 12, wherein it is controlled to cancel selection to be executed in said selecting step when said judging step judges that the plural image output devices selected in said selecting step do not have the same-sized and the same-kind of output media.

14. A method according to claim 8, further comprising an inputting step of inputting image data obtained by reading originals, wherein the plural image output devices can output images of image data inputted in said inputting step.

15. A storage medium which stores computer-readable program codes for executing control processing of an image output control apparatus adapted to control output of images of input data using plural image output devices, comprising the codes of:
- executing mode selection processing of selecting a cascade outputting mode so that output processing of the input data is allotted to the plural image output devices;
- executing selection processing of selecting the plural image output devices that should be used in the cascade outputting mode;
- executing obtaining processing of obtaining output media information stored in each image output device of the plural image output devices that should be used in the cascade outputting mode;
- executing judgment processing of judging whether or not the plural image output devices store the same-sized output media on the basis of the output media information obtained by said obtaining processing, before a user request for causing the plural image output devices to execute an outputting operation for the cascade outputting is accepted from a user via a user interface unit;
- executing notification processing of notifying of a judgment result obtained by said judgment processing; and
- executing control processing of prohibiting a reception of the user request via said user interface unit in a case where the same-sized output media are not stored in the plural image output devices, and permitting the reception of the user request via said user interface unit in a case where the same-sized output media are stored in the plural image output devices,
- wherein said control processing causes the plural image output devices to execute the outputting operation for the cascade outputting mode after permitting the reception of the user request and accepting the user request via said user interface unit.

16. An image output system comprising:
- plural image output devices,
- each of said plural image output devices comprising:
- a memory unit adapted to store a plurality of data;
- a printer unit adapted to perform print processing of data stored in said memory unit to an output medium;
- an acceptor adapted to accept, via a user interface unit, an instruction for causing user's device and another image output device to execute a cascade printing operation that print processing of a series of data is able to allot to said user's device and said another image output device, from a user; and
- a controller adapted to prohibit a reception of the instruction via said user interface unit from the user in a case where the same output medium is not set in both of said user's device and said another image output device, and to permit the reception of the instruction via said user interface unit from the user in a case where the same output medium is set in both of said user's device and said another image output device,
- wherein said controller allows execution of the cascade printing operation in said user's device and said another image output device, after permitting the reception of instruction via said user interface unit from the user and accepting the instruction via said user interface unit.

17. A system according to claim 16, wherein said controller inhibits said execution of said cascade printing operation before the instruction from the user is accepted, by controlling beforehand said acceptor so as not to accept the instruction from the user, when the same output medium is not set in both of said user's device and said another image output device.

18. A system according to claim 16, wherein the instruction is accepted via a user interface unit including a display unit used for said image output device, wherein said controller inhibits the execution of the cascade printing operation before the instruction from the user is accepted, by controlling a display of said display unit so as not to accept the instruction, when the same output medium is not set in both of said user's device and said another image output device.

19. A system according to claim 16, wherein each of said plural image output devices includes an original image reading unit.

20. A system according to claim 16, wherein each of said plural image output devices is arranged so as to effect the cascade printing operation of at least one of image data output from a scanner and image data output from a computer.

21. A system according to claim 16, wherein each of said plural image output devices includes an obtaining unit adapted to obtain information of the another image output device, and wherein said controller discriminates the output medium using the information obtained by said obtaining unit.

22. An image output device system comprising:
- plural image output devices,
- each of said plural image output devices comprising:
- a memory unit adapted to store a plurality of data;
- a printer unit adapted to perform print processing of data stored in said memory unit to an output medium;
- an acceptor adapted to accept, via a user interface unit, an instruction for causing user's device and another image output device to execute a cascade printing operation that print processing of a series of data is able to allot to said user's device and said another image output device, from a user; and
- a controller adapted to prohibit a reception of the instruction via said user interface unit from the user in a case where an output medium of the same size is not set in both of said user's device and said another image output device, and to permit the reception of the instruction via said user interface unit from the user in a case where the output medium of the same size is set in both of said user's device and said another image output device,
- wherein said controller allows execution of the cascade printing operation in said user's device and said another image output device, after permitting the reception of the instruction via said user interface unit from the user and accepting the instruction via said user interface unit.

23. A system according to claim 22, wherein said controller inhibits said execution of said cascade printing operation before the instruction from the user is accepted, by controlling beforehand said acceptor so as not to accept the instruction from the user, when the output medium of the same size is not set in both of said user's device and said another image output device.

24. A system according to claim 22, wherein the instruction is accepted via a user interface unit including a display unit used for said image output device,
  wherein said controller inhibits the execution of said cascade printing operation before the instruction from the user is accepted, by controlling a display of said display unit so as not to accept the instruction, when the output medium of the same size is not set in both of said user's device and said another image output device.

25. A system according to claim 22, wherein each of said plural image output devices includes an original image reading unit.

26. A system according to claim 22, wherein each of said plural image output devices is arranged so as to effect the cascade printing operation of at least one of image data output from a scanner and image data output from a computer.

27. A system according to claim 22, wherein each of said plural image output devices includes an obtaining unit adapted to obtain information of the another image output device, and wherein said controller discriminates the output medium using the information obtained by said obtaining unit.

28. An image output system comprising:
plural image output devices,
each of said plural image output devices comprising:
a memory unit adapted to store a plurality of data;
a printer unit adapted to perform print processing of data stored in said memory unit to an output medium;
an acceptor adapted to accept, via a user interface unit, an instruction for causing user's device and another image output device to execute a cascade printing operation that print processing of a series of data is able to allot to said user's device and said another image output device, from a user; and
a controller adapted to prohibit a reception of the instruction via said user interface unit from the user in a case where an output medium of the same type is not set in both of said user's device and said another image output device, and to permit the reception of the instruction via said user interface unit from the user in a case where the output medium of the same type is set in both of said user's device and said another image output device,
wherein said controller allows execution of the cascade printing operation in said user's device and said another image output device, after permitting the reception of the instruction via said user interface unit from the user and accepting the instruction via said user interface unit.

29. A system according to claim 28, wherein said controller inhibits the execution of the cascade printing operation before the instruction from the user is accepted, by controlling beforehand said acceptor so as not to accept the instruction from the user, when the output medium of the same type is not set in both of said user's device and said another image output device.

30. A system according to claim 28, wherein the instruction is accepted via a user interface unit including a display unit used for said image output device, and
wherein said controller inhibits the execution of the cascade printing operation before the instruction from the user is accepted, by controlling a display of said display unit so as not to accept the instruction, when the output medium of the same type is not set in both of said user's device and said another image output device.

31. A system according to claim 28, wherein each of said plural image output devices includes an original image reading unit.

32. A system according to claim 28, wherein each of said plural image output devices is arranged so as to effect the cascade printing operation of at least one of image data output from a scanner and image data output from a computer.

33. A system according to claim 28, wherein each of said plural image output devices includes an obtaining unit adapted to obtain information of the another image output device, and wherein said controller discriminates the output medium using the information obtained by said obtaining unit.

34. A system according to claim 28, wherein the type of the output medium is one of ordinary paper, card, thin paper, OHP and color sheet.

35. An image output system comprising:
plural image output devices,
each of said plural image output devices comprising:
a memory unit adapted to store a plurality of data;
a printer unit adapted to perform print processing of data stored in said memory unit to an output medium;
an acceptor adapted to accept, via a user interface unit, an instruction for causing user's device and another image output device to execute a cascade printing operation that print processing of a series of data is able to allot to said user's device and said another image output device, from a user; and
a controller adapted to prohibit a reception of the instruction via said user interface unit from the user in a case where an output medium of the same size and the same type is not set in both of said user's device and said another image output device, and to permit the reception of the instruction via said user interface unit from the user in a case where the output medium of the same size and the same type is set in both of said user's device and said another image output device,
wherein said controller allows execution of the cascade printing operation in said user's device and said another image output device, after permitting the reception of the instruction via said user interface unit from the user and accenting the instruction via said user interface unit.

36. A system according to claim 35, wherein said controller inhibits said execution of said cascade printing operation before the instruction from the user is accepted, by controlling beforehand said acceptor so as not to accept the instruction from the user, when the output medium of the same size and the same type is not set in both of said user's device and said another image output device.

37. A system according to claim 35, wherein the instruction is accepted via a user interface unit including a display unit used for said image output device, and
wherein said controller inhibits the execution of said cascade printing operation before the instruction from the user is accepted, by controlling a display of said display unit so as not to accept the instruction, when the output medium of the same size and the same type is not set in both of said user's device and said another image output device.

38. A system according to claim 35, wherein each of said plural image output devices includes an original image reading unit.

39. A system according to claim 35, wherein each of said plural image output devices is arranged so as to effect the cascade printing operation of at least one of image data output from a scanner and image data output from a computer.

40. A system according to claim 35, wherein each of said plural image output devices includes an obtaining unit adapted to obtain information of the another image output device, and wherein said controller discriminates the output medium using the information obtained by said obtaining unit.

41. A system according to claim 35, wherein the type of the output medium is one of ordinary paper, card, thin paper, OHP and color sheet.

42. An image output system comprising:
plural image output devices,
each of said plural image output devices comprising:
a memory unit adapted to store a plurality of data;
a printer unit adapted to perform print processing of data stored in said memory unit by using a resource;
an acceptor adapted to accept, via a user interface unit, an instruction for causing user's device and another image output device to execute a cascade printing operation that print processing of a series of data is able to allot to said user's device and said another image output device, from a user; and
a controller adapted to prohibit a reception of the instruction via said user interface unit from the user in a case where a certain resource is not set in both of said user's device and said another image output device even if said another image output device has the same function as said user's device has, and to permit the reception of the instruction via said user interface unit from the user in a case where the certain resource is set in both of said user's device and said another image output device,
where said controller allows execution of the cascade printing operation in said user's device and said another image output device, after permitting the reception of the instruction via said user interface unit from the user and accepting the instruction via said user interface unit.

43. A system according to claim 42, wherein said controller inhibits the execution of the cascade printing operation before the instruction from the user is accepted, by controlling beforehand said acceptor so as to not accept the instruction from the user, even if said another image output device has the same function as the function that said user's device has, when the certain resource is not set in both of said user's device and said another image output device.

44. A system according to claim 42, wherein the instruction is accepted via a user interface unit including a display unit used for said image output device, and
wherein said controller inhibits the execution of the cascade printing operation before the instruction from the user is accepted, by controlling a display of said display unit so as not to accept the instruction, even if said another image output device has the same function as the function that said user's device has, when the certain resource is not set in both of said user's device and said another image output device.

45. A system according to claim 42, wherein each of said plural image output devices includes an original image reading unit.

46. A system according to claim 42, wherein each of said plural image output devices is arranged so as to effect the cascade printing operation of at least one of image data output from a scanner and image data output from a computer.

47. A system according to claim 42, wherein each of said plural image output devices includes an obtaining unit adapted to obtain information of the another image output device, and wherein said controller discriminates the output medium using the information obtained by said obtaining unit.

48. A system according to claim 42, wherein said controller permits the execution of the cascade printing operation in said user's device and said another image output device, according to the instruction from the user, when the same output medium is set in both of said user's device and said another image output device,
wherein said controller inhibits the execution of the cascade printing operation that uses a different output medium in each of said user's device and said another image output device, before the instruction from the user is accepted, even if said another image output device has the same function as the function which includes at least one of a sort function and a double-side printing function that said user's device has, when the same output medium is not set in both of said user's device and said another image output device.

49. A system according to claim 42, wherein said controller permits the execution of the cascade printing operation in said user's device and said another image output device, according to the instruction from the user, when an output medium of the same size is set in both of said user's device and said another image output device,
wherein said controller inhibits the execution of the cascade printing operation that uses an output medium of a different size in each of said user's device and said another image output device, before the instruction from the user is accepted, even if said another image output device has the same function as the function which includes at least one of a sort function and a double-side printing function that said user's device has, when the output medium of the same size is not set in both of said user's device and said another image output device.

50. A system according to claim 42, wherein said controller permits the execution of the cascade printing operation in said user's device and said another image output device, according to the instruction from the user, when an output medium of the same type is set in both of said user's device and said another image output device,
wherein said controller inhibits the execution of the cascade printing operation that uses an output medium of a different type in each of said user's device and said another image output device, before the instruction from the user is accepted, even if said another image output device has the same function as the function which includes at least one of a sort function and a double-side printing function that said user's device has, when the output medium of the same type is not set in both of said user's device and said another image output device.

51. A system according to claim 42, wherein said controller permits the execution of the cascade printing operation in said user's device and said another image output device, according to the instruction from the user, when an output medium of the same size and the same type is set in both of said user's device and said another image output device,
wherein said controller inhibits the execution of the cascade printing operation that uses an output medium of a different size and a different type in each of said user's device and said another image output device, before the instruction from the user is accepted, even if said another image output device has the same function as the function which includes at least one of a sort function and a double-side printing function that said user's device has, when the output medium of the same size and the same type is not set in both of said user's device and said another image output device.

52. A method of operating an image output system which includes plural image output devices, wherein each of the plural image output devices includes a memory unit adapted to store a plurality of data and includes a printer unit adapted to perform print processing of data stored in the memory unit to an output medium, said method comprising:

a step of accepting, via a user interface unit, an instruction for causing said plural image output devices to execute a cascade printing operation that print processing of a series of data is able to allot with said plural image output devices, from a user;

a step of prohibiting a reception of the instruction via said user interface unit from the user in a case where the same output medium is not set in each of said plural image output devices;

a step of permitting the reception of the instruction via said user interface unit from the user in a case where the same output medium is set in each of said plural image output devices; and a step of allowing an execution of the cascade printing operation in each of said plural image output devices, after permitting the reception of the instruction via said user interface unit from the user and accepting the instruction via said user interface unit.

53. A method according to claim 52, wherein said method inhibits the execution of the cascade printing operation before the instruction from the user is input, by controlling beforehand said user interface unit so as to not input the instruction from the user, when the same output medium is not set in each of the plural image output devices.

54. A method according to claim 52, wherein the instruction is input via a user interface unit including a display unit, wherein said method inhibits the execution of the cascade printing operation before the instruction from the user is input, by controlling a display of the display unit so as to not input the instruction, when the same output medium is not set in each of the plural image output devices.

55. A method according to claim 52, wherein each of the plural image output devices is arranged so as to print at least one of image data output from a scanner and image data output from a computer, wherein said inputting step includes a step of inputting the instruction via a user interface unit which includes a display unit of the computer, and wherein said inhibiting step includes a step of controlling display by the display unit of the computer so as not to accept the instruction from the user when the same output medium is not set in each of said image output devices, thereby inhibiting the execution of the cascade printing operation before acceptance of the instruction.

56. A method according to claim 52, wherein each of the plural image output devices is arranged so as to print at least one of image data output from a scanner and image data output from a computer, wherein said inputting step includes a step of inputting the instruction via a user interface unit which includes a display unit used in each of the plural image output devices, and wherein said inhibiting step includes a step of controlling display by the display unit of the image output device so as not to accept the instruction from the user when the same output medium is not set in each of the plural image output devices, thereby inhibiting the execution of the cascade printing operation before acceptance of the instruction.

57. A method according to claim 52, wherein each of the plural image output devices includes an image forming device of composite function type, which has a copy function and a print function.

58. A method according to claim 52, further comprising:

a step of obtaining information of at least one of the plural image output devices; and a step of displaying the obtained information of the image output device on a display unit.

59. A method of operating an image output system which includes plural image output devices, wherein each of the plural image output devices includes a memory unit adapted to store a plurality of data and includes a printer unit adapted to perform print processing of data stored in the memory unit to an output medium, said method comprising:

a step of accepting, via a user interface unit, an instruction for causing said plural image output devices to execute a cascade printing operation that print processing of a series of data is able to allot with said plural image output devices, from a user;

a step of prohibiting a reception of the instruction via said user interface unit from the user in a case where an output medium of the same size is not set in each of said plural image output devices;

a step of permitting the reception of the instruction via said user interface unit from the user in a case where the output medium of the same size is set in each of said plural image output devices; and a step of allowing an execution of the cascade printing operation in each of said plural image output devices, after permitting the reception of the instruction via said user interface unit from the user and accepting the instruction via said user interface unit.

60. A method according to claim 59, wherein said method inhibits the execution of the cascade printing operation before the instruction from the user is input, by controlling beforehand said user interface unit so as not to input the instruction from the user, when the output medium of the same size is not set in each of the plural image output devices.

61. A method according to claim 59, wherein the instruction is input via a user interface unit including a display unit, and wherein said method inhibits the execution of the cascade printing operation before the instruction from the user is input, by controlling a display of the display unit so as to not input the instruction, when the output medium of the same size is not set in each of the plural image output devices.

62. A method according to claim 59, wherein each of the plural image output devices is arranged so as to print at least one of image data output from a scanner and image data output from a computer, wherein said inputting step includes a step of inputting the instruction via a user interface unit which includes a display unit of the computer, and wherein said inhibiting step includes a step of controlling display by the display unit of the computer so as not to accept the instruction from the user when the same output medium is not set in each of the plural image output devices, thereby inhibiting the execution of the cascade printing operation before acceptance of the instruction.

63. A method according to claim 59, wherein each of the plural image output devices is arranged so as to print at least one of image data output from a scanner and image data output from a computer, wherein said inputting step includes a step of inputting the instruction via a user interface unit which includes a display unit used in each of the plural image output devices, and wherein said inhibiting step includes a step of controlling display by the display unit of the image output device so as not to accept the instruction from the user when the same output medium is not set in each of the plural image output devices, thereby inhibiting the execution of the cascade printing operation before acceptance of the instruction.

64. A method according to claim 59, wherein each of the plural image output devices includes an image forming device of composite function type, which has a copy function and a print function.

65. A method according to claim 59, further comprising:
   a step of obtaining information of at least one of the plural image output devices; and
   a step of displaying the obtained information of the image output device on a display unit.

66. A method of operating an image output system which includes plural image output devices, wherein each of the plural image output devices includes a memory unit adapted to store a plurality of data and includes a printer unit adapted to perform print processing of data stored in the memory unit to an output medium, said method comprising:
   a step of accepting, via a user interface unit, an instruction for causing said plural image output devices to execute a cascade printing operation that print processing of a series of data is able to allot with said plural image output devices, from a user;
   a step of prohibiting a reception of the instruction via said user interface unit from the user in a case where an output medium of the same type is not set in each of said plural image output devices;
   a step of permitting the reception of the instruction via said user interface unit from the user in a case where the output medium of the same type is set in each of said plural image output devices; and
   a step of allowing an execution of the cascade printing operation in each of said plural image output devices, after permitting the reception of the instruction via said user interface unit from the user and accepting the instruction via said user interface unit.

67. A method according to claim 66, wherein said method inhibits the execution of the cascade printing operation before the instruction from the user is input, by controlling beforehand said user interface unit so as not to input the instruction from the user, when the output medium of the same type is not set in each of the plural image output devices.

68. A method according to claim 66, wherein the instruction is input via a user interface unit including a display unit, and wherein said method inhibits the execution of the cascade printing operation before the instruction from the user is input, by controlling a display of the display unit so as to not input the instruction, when the output medium of the same type is not set in each of said plural image output devices.

69. A method according to claim 66, wherein each of the plural image output devices is arranged so as to print at least one of image data output from a scanner and image data output from a computer, wherein said inputting step includes a step of inputting the instruction via a user interface unit which includes a display unit, and wherein said inhibiting step includes a step of controlling display by said display unit so as not to accept the instruction from the user when the same output medium is not set in each of the plural image output devices, thereby inhibiting the execution of the cascade printing operation before acceptance of the instruction.

70. A method according to claim 66, wherein each of the plural image output devices is arranged so as to print at least one of image data output from a scanner and image data output from a computer, wherein said inputting step includes a step of inputting the instruction via a user interface unit which includes a display interface unit which includes a display unit used in each of said plural image output devices, and wherein said inhibiting step includes a step of controlling display of the display unit of the image output device so as not to accept the instruction from the user when the same output medium is not set in each of the plural image output devices, thereby inhibiting the execution of the cascade printing operation before acceptance of the instruction.

71. A method according to claim 66, wherein each of the plural image output devices includes an image forming device of composite function type, which has a copy function and a print function.

72. A method according to claim 66, further comprising:
   a step of obtaining information of at least one of the plural image output devices; and
   a step of displaying the obtained information of the image output device on a display unit.

73. A method according to claim 66, wherein the type of the output medium is at least one of ordinary paper, card, thin paper, OHP and color sheet.

74. A method of operating an image output system which includes plural image output devices, wherein each of the plural image output devices includes a memory unit adapted to store a plurality of data and includes a printer unit adapted to perform print processing of data stored in the memory unit to an output medium, said method comprising:
   a step of accepting, via a user interface unit, an instruction for causing said plural image output devices to execute a cascade printing operation that print processing of a series of data is able to allot with said plural image output devices, from a user;
   a step of prohibiting a reception of the instruction via said user interface unit from the user in a case where an output medium of the same size and the same type is not set in each of said plural image output devices;
   a step of permitting the reception of said instruction via said user interface unit from the user in a case where the output medium of the same size and the same type is set in each of said plural image output devices; and
   a step of allowing an execution of the cascade printing operation in each of said plural image output devices, after permitting the reception of the instruction via said user interface unit from the user and accepting the instruction via said user interface unit.

75. A method according to claim 74, wherein said method inhibits the execution of the cascade printing operation before the instruction from the user is input, by controlling beforehand said user interface unit so as to not input the instruction from the user, when the output medium of the same size and the same type is not set in each of the plural image output devices.

76. A method according to claim 74, wherein the instruction is input via a user interface unit including a display unit, and wherein said method inhibits the execution of the cascade printing operation before the instruction from the user is input, by controlling a display of the display unit so as not to input said instruction, when the output medium of the same size and the same type is not set in each of the plural image output devices.

77. A method according to claim 74, wherein each of the plural image output devices is arranged so as to print at least one of image data output from a scanner and image data output from a computer, wherein said inputting step includes a step of inputting the instruction via a user interface unit which includes a display unit, and wherein said inhibiting step includes a step of controlling display by the display unit so as not to accept the instruction from the user when the same output medium is not set in each of the plural image output devices, thereby inhibiting the execution of the cascade printing operation before acceptance of the instruction.

78. A method according to claim 74, wherein each of the plural image output devices is arranged so as to print at least one of image data output from a scanner and image data output from a computer, wherein said inputting step includes a step of inputting the instruction via a user interface unit which includes a display unit used in each of said plural image output devices, and wherein said inhibiting step includes a step of controlling display by the display unit of the image output device so as not to accept the instruction from the user when the same output medium is not set in each of the plural image output devices, thereby inhibiting the execution of the cascade printing operation before acceptance of the instruction.

79. A method according to claim 74, wherein each of the plural image output devices includes an image forming device of composite function, which has a copy function and a print function.

80. A method according to claim 74, further comprising:
a step of obtaining information of at least one of the plural image output devices; and
a step of displaying the obtained information of the image output device on a display unit.

81. A method according to claim 74, wherein the type of the output medium is at least one of ordinary paper, card, thin paper, OHP and color sheet.

82. A method of operating an image output system which includes plural image output devices, wherein each of the plural image output devices includes a memory unit adapted to store a plurality of data and includes a printer unit adapted to perform print processing of data stored in the memory unit by using a resource, said method comprising:
a step of accepting, via a user interface unit, an instruction for causing said plural image output devices to execute a cascade printing operation that print processing of a series of data is able to allot with said plural image output devices, from a user;
a step of prohibiting a reception of the instruction via said user interface unit from the user, even if each of said plural image output devices has the same function, in a case where certain resource is not set in each of said plural image output devices;
a step of permitting the reception of the instruction via said user interface unit from the user in a case where the certain resource is set in each of said plural image output devices; and
a step of allowing an execution of the cascade printing operation in each of said plural image output devices, after permitting the reception of the instruction via said user interface unit from the user and accepting the instruction via said user interface unit was accepted.

83. A method according to claim 82, wherein said method inhibits the execution of the cascade printing operation before the instruction from the user is input, by controlling beforehand said user interface unit so each of the plural image output devices has the same function, when the certain resource is not set in each of the plural image output devices.

84. A method according to claim 82, wherein the instruction is input via a user interface unit which includes a display unit,
wherein said method inhibits the execution of the cascade printing operation before the instruction from the user is input, by controlling a display of the display unit so as not to accept the instruction, even if each of said plural image output devices has the same function, when the certain resource is not set in each of the plural image output devices.

85. A method according to claim 82, wherein each of the plural image output devices is arranged so as to print at least one of image data output from a scanner and image data output from a computer, wherein said inputting step includes a step of inputting the instruction via a user interface unit which includes a display unit, and wherein said inhibiting step includes a step of controlling display by the display unit so as not to accept the instruction from the user when the certain resource is not set in each of said plural image output devices, thereby inhibiting the execution of the cascade printing operation before acceptance of the instruction.

86. A method according to claim 82, wherein each of the plural image output devices is arranged so as to print at least one of image data output from a scanner and image data output from a computer, wherein said inputting step includes a step of inputting the instruction via a user interface unit which includes a display unit used in each of the plural image output devices, and wherein said inhibiting step includes a step of controlling display by the display unit of the image output device so as not to accept the instruction from the user when the certain resource is not set in each of the plural image output devices, thereby inhibiting the execution of the cascade printing operation before acceptance of the instruction.

87. A method according to claim 82, wherein each of the plural image output devices includes an image forming device of composite function type, which has a copy function and a print function.

88. A method according to claim 82, further comprising:
a step of obtaining information of at least one of the plural image output devices; and
a step of displaying the obtained information of the image output device on a display unit.

89. A method according to claim 82, wherein said method permits the execution of the cascade printing operation in the plural image output devices, according to an input of the instruction from the user, when the same output medium is set in each of the plural image output devices,
wherein said method inhibits the execution of the cascade printing operation that uses a different output medium in each of said plural image output devices, before the instruction from the user is input, even if each of the plural image output devices has the same function which includes at least one of a sort function and a double-side printing function, when the same output medium is not set in each of the plural image output devices.

90. A method according to claim 82, wherein said method permits the execution of the cascade printing operation in the plural image output devices, according to an input of the instruction from the user, when an output medium of the same size is set in each of the plural image output devices,
wherein said method inhibits the execution of the cascade printing operation that uses an output medium of a different size in each of the plural image output devices, before the instruction from the user is input, even if each of the plural image output devices has the same function which includes at least one of a sort function and a double-side printing function, when the output medium of the same size is not set in each of the plural image output devices.

91. A method according to claim 82, wherein said method permits the execution of the cascade printing operation in the plural image output devices, according to an input of the instruction from the user, when an output medium of the same type is set in each of the plural image output devices,
wherein said method inhibits the execution of the cascade printing operation that uses an output medium of a different type in each of said plural image output devices, before the instruction from the user is input, even if each of the plural image output devices has the same function which includes at least one of a sort of function and a double-side printing function, when the output medium of the same type is not set in each of the plural image output devices.

92. A method according to claim 82, wherein said method permits the execution of the cascade printing operation in the plural image output devices, according to an input of the instruction from the user, when an output medium of the same size and the same type is set in each of the plural image output devices,
wherein said method inhibits the execution of the cascade printing operation that uses an output medium of a different size and a different type in each of the plural image output devices, before the instruction from the user is input, even if each of the plural image output devices has the same function which includes at least one of a sort function and a double-side printing function, when the output medium of the same size and the same type is not set in each of the plural image output devices.

93. A storage medium for storing a computer readable program for causing a computer to execute the method of claim 52.

94. A storage medium for storing a computer readable program for causing a computer to execute the method of claim 59.

95. A storage medium for storing a computer readable program for causing a computer to execute the method of claim 66.

96. A storage medium for storing a computer readable program for causing a computer to execute the method of claim 74.

97. A storage medium for storing a computer readable program for causing a computer to execute the method of claim 82.

* * * * *

UNITED STATES PATENT AND TRADEMARK OFFICE
CERTIFICATE OF CORRECTION

PATENT NO. : 7,167,257 B2
APPLICATION NO. : 09/769466
DATED : January 23, 2007
INVENTOR(S) : Hiroshi Matsuda It is certified that error appears in the above-identified patent and that said Letters Patent is hereby corrected as shown below:

ON THE TITLE PAGE
At Item (56), Foreign Patent Documents, "07095334 A" should read --7-95334 A--, and "2000206836 A" should read --2000-206836 A--.
At Item (57), Abstract, line 12, "the image" should read --image--.

COLUMN 1
Line 20, "to" should be deleted.
Line 28, "as" should be deleted.
Line 41, "In" should read --In the--.

COLUMN 2
Line 60, "are" should read --is--.

COLUMN 5
Line 21, "an entire" should read --the entirety--.
Line 36, "an entire of the" should read --the entire--.
Line 43, "an entire of the" should read --the entire--.

COLUMN 7
Line 43, "plane" should read --plan--.

COLUMN 9
Line 1, "waiting the" should read --waiting for the--.
Line 36, "content" should read --contents--.

COLUMN 10
Line 10, "to the" should read --to each--.
Line 12, "each" should be deleted.
Line 15, "the each" should read --each--.
Line 20, "the selected each" should read --each selected--.

COLUMN 13
Line 4, "of which" should read --whose--.
Line 21, "of which size" should read --whose size is--.

UNITED STATES PATENT AND TRADEMARK OFFICE
CERTIFICATE OF CORRECTION

PATENT NO. : 7,167,257 B2
APPLICATION NO. : 09/769466
DATED : January 23, 2007
INVENTOR(S) : Hiroshi Matsuda It is certified that error appears in the above-identified patent and that said Letters Patent is hereby corrected as shown below:

COLUMN 14
Line 25, "(so called a reversely" should read --a so-called reverse--.
Line 66, "information of" should read --information--.

COLUMN 15
Line 10, "the one" should read --that one--.

COLUMN 16
Line 7, "not" should be deleted.

COLUMN 17
Line 15, "the one" should read --that one--.
Line 59, "the selected each" should read --each selected--.

COLUMN 20
Line 63, "in" should read --if, in--.

COLUMN 22
Line 36, "once" should be deleted.
Line 40, "process" should read --processes--.
Line 41, "such the" should read --such--.

COLUMN 23
Line 49, "same-kind" should read --same kind--.
Line 56, "same-" should read --same--.

COLUMN 24
Line 49, "same-kind" should read --same kind--.
Line 57, "same-kind" should read --same kind--.
Line 62, "same-kind" should read --same kind--.

COLUMN 25
Line 45, "user's" should read --a user's--.

UNITED STATES PATENT AND TRADEMARK OFFICE
CERTIFICATE OF CORRECTION

PATENT NO.        : 7,167,257 B2
APPLICATION NO.   : 09/769466
DATED             : January 23, 2007
INVENTOR(S)       : Hiroshi Matsuda It is certified that error appears in the above-identified patent and that said Letters Patent is hereby corrected as shown below:

COLUMN 26
Line 34, "user's" should read --a user's--.

COLUMN 28
Line 20, "user's" should read --a user's--.

COLUMN 29
Line 14, "user's" should read --a user's--.

COLUMN 35
Line 49, "where" should read --where a--.
Line 60, "was accepted" should be deleted.

COLUMN 37
Line 15, "sort of" should read --sort--.

Signed and Sealed this

Tenth Day of February, 2009

JOHN DOLL
*Acting Director of the United States Patent and Trademark Office*